(12) United States Patent
Funk et al.

(10) Patent No.: US 7,598,898 B1
(45) Date of Patent: *Oct. 6, 2009

(54) METHOD FOR USING LOGGING DEVICE WITH DOWN-HOLE TRANSCEIVER FOR OPERATION IN EXTREME TEMPERATURES

(75) Inventors: Eric E. Funk, Ouray, CO (US); Ethan A. Funk, Ouray, CO (US); Michael L. Sheriff, Plano, TX (US); Scott M. McCarthy, Fulshear, TX (US); Robert R. McDaniel, Houston, TX (US)

(73) Assignee: Hexion Specialty Chemicals, Inc., Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/520,229

(22) Filed: Sep. 13, 2006

(51) Int. Cl.
    *G01S 13/88* (2006.01)
    *G01V 3/30* (2006.01)
    *G01V 3/18* (2006.01)

(52) U.S. Cl. .......................... 342/22; 342/54; 342/175

(58) Field of Classification Search .................. 342/22, 342/54, 175, 195
See application file for complete search history.

(56) References Cited

U.S. PATENT DOCUMENTS

| | | | |
|---|---|---|---|
| 3,720,949 A * | 3/1973 | Richter | ...................... 342/26 D |
| 3,947,782 A | 3/1976 | Lohn | |
| 3,967,235 A | 6/1976 | Dennis et al. | |
| 4,314,373 A | 2/1982 | Sellers | |
| 4,609,873 A | 9/1986 | Cox et al. | |
| 5,552,786 A | 9/1996 | Xia et al. | |
| 5,898,517 A | 4/1999 | Weis | |
| 6,024,166 A * | 2/2000 | McGarian et al. | ........... 166/55.2 |
| 6,041,860 A | 3/2000 | Nazzal et al. | |
| 6,269,198 B1 | 7/2001 | Hodgson et al. | |
| 6,408,943 B1 | 6/2002 | Schultz et al. | |
| 6,525,540 B1 * | 2/2003 | Kong et al. | .................. 324/338 |
| 6,538,576 B1 | 3/2003 | Schultz et al. | |
| 7,160,409 B2 * | 1/2007 | Reynolds et al. | ............. 156/172 |

(Continued)

FOREIGN PATENT DOCUMENTS

WO    WO 2006/054079    5/2006

OTHER PUBLICATIONS

Phase-coded LIDAR Mark Bashkansky and Eric Funk CLEO 2002 Friday morning 10:30am p. 648.*

(Continued)

*Primary Examiner*—Thomas H Tarcza
*Assistant Examiner*—Cassi Galt

(57) ABSTRACT

A logging radar system and method for measuring propped fractures and down-hole formation conditions in a subterranean formation including: a radar source; an optical source; an optical modulator for modulating an optical signal from the optical source according to a signal from the radar source; a photodiode for converting the modulated optical signal output from the optical modulator to the source radar signal; a transmitter and receiver unit; and a mixer. The transmitter and receiver unit receives the source radar signal from the photodiode, transmits the source radar signal into the formation and receives a reflected radar signal. The mixer mixes the reflected radar signal with the source radar signal to provide an output. This technology can be used to describe all fractures connected to the wellbore and differentiate between the dimensions of the two vertical wings of a propped fracture.

20 Claims, 25 Drawing Sheets

U.S. PATENT DOCUMENTS

| | | | |
|---|---|---|---|
| 7,450,053 B2 * | 11/2008 | Funk et al. ................... 342/22 |
| 2002/0112855 A1 | 8/2002 | Arndt et al. |
| 2004/0256100 A1 | 12/2004 | Tubel et al. |
| 2005/0183858 A1 * | 8/2005 | Ayoub et al. ............ 166/250.1 |
| 2005/0251342 A1 * | 11/2005 | Market et al. .................. 702/6 |
| 2005/0274510 A1 | 12/2005 | Nguyen et al. |
| 2006/0102343 A1 | 5/2006 | Skinner et al. |
| 2006/0102345 A1 * | 5/2006 | McCarthy et al. ........ 166/250.1 |
| 2006/0152383 A1 * | 7/2006 | Yamate et al. ........... 340/853.1 |

OTHER PUBLICATIONS

L.S. Raymond et al., Oct. 20, 1977, Development of Passive Electronic Components for Instrumentation of Improved Geothermal Logging Tools and Components. Annual Progress Report.

* cited by examiner

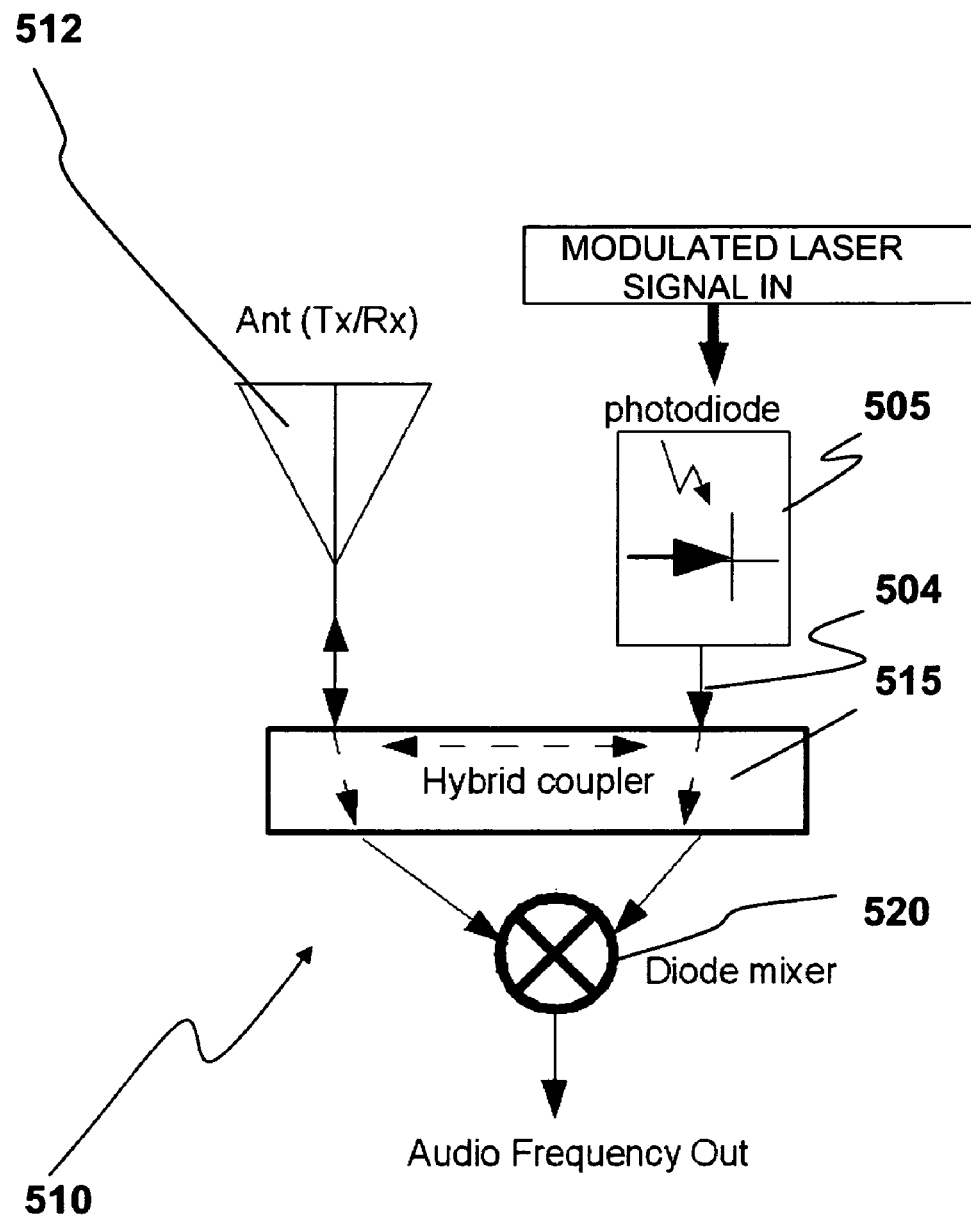

METHOD FOR USING LOGGING DEVICE WITH DOWN-HOLE TRANSCEIVER FOR OPERATION IN EXTREME TEMPERATURES

FIELD OF THE INVENTION

The present device relates to logging radar devices. More particularly, the present invention relates to radar systems that use electromagnetic wave propagation to locate and identify changes in electromagnetic waves in the ground, wherein at least a portion of the operation occurs in a borehole (also known as "down-hole" as referred to in the art).

BACKGROUND OF THE INVENTION

Oil exploration and developing oil wells often pose great financial risks because the costs are substantial. To mitigate some of the financial risks, logging has become essential in nearly every phase of exploration as well as drilling, completing and producing the well. Logging techniques provide information on the depth of formations, the presence of oil, the bottom-hole or formation temperature as well as data associated to the success of completion techniques, initial formation/reservoir pressures and various data related to stimulation treatments that are often applied to increase production rates.

Often the key to attaining an acceptable production rate and its associated financial results lies in the well's response to stimulation techniques (in particular hydraulic fracturing). The technique referred to as hydraulic fracturing describes a process in which a fluid (either thin or viscous) is pumped into the targeted formation at a rate in excess of what can be dissipated through the natural permeability of the formation rock. This results in a pressure build up until such pressure exceeds the strength of the formation rock. When this occurs, the formation rock fails and a so-called "fracture" is initiated. With continued pumping, the fracture grows in length, width and height. At a predetermined time in the pumping process, solid particulate is added to the fluid that is being pumped. This particulate is carried down the well, out of the wellbore and deposited in the created fracture. It is the purpose of this specially designed particulate to keep the fracture from "healing" to its initial position (after pumping has ceased). The particulate is said to be propping open the fracture and is therefore designated as "proppant". The fracture, which is generated by the application of this stimulation technique, creates a conductive path to the wellbore for the hydrocarbon. Critical to the process of optimizing the design of a hydraulic fracturing treatment, is the determination of the created fracture geometry (in particular fracture length).

Currently there are logging techniques that give limited information on fracture height, but virtually no technique that gives any reliable data connected to propped fracture length.

The lack of an accurate assessment of propped fracture length is due to a combination of factors. First and foremost is the fact that propped fractures can extend for hundreds of feet away from the wellbore. Prior to the development of the technique of the present invention, which utilizes penetrating radar waves, there was no proven technology available that could determine this substantial length aspect (with a reasonable degree of accuracy). Secondly, the down-hole conditions (in particular temperature and pressure) encountered by logging equipment limited the electronic equipment that could be used, types of signals that could be generated and the type of data gathered by this type equipment. It is not uncommon for logging equipment to be subjected to temperatures in excess of 200° C. and pressures up to and exceeding 10,000 psi.

Thus, via logging and other technologies such as pressure analysis and production history matching, the potential productivity of a given well can be more accurately evaluated. However, current logging devices do not address all critical data requirements and more sophisticated equipment may not stand up well to the environmental conditions of a borehole. For example, temperatures may exceed 200° C. down-hole, and this type of heat limits the electronic sensors and circuits that can be used in a logging device.

FIG. 1 shows an example of a typical wellbore that is reinforced with a metal casing 100. Perforations 105 are created in the metal casing at pre-determined depths in the wellbore to enable hydrocarbon (oil or gas) to flow into the casing. A fracturing fluid (either with or without propping agents) is pumped at high pressures through the perforations to create a fracture and to transport the proppant to the designed fracture length. This propping agent (also called proppant) prevents the fracture from closing once pumping has ceased. The predominant fracture configuration is in the form of two wedge-like shapes oriented approximately 180 degrees from each other and extending out from the wellbore. Such a configuration would be characterized by dimensions of width "W", height "H" and length "L". The propped fracture provides a highly conductive conduit for the hydrocarbon to travel from the reservoir into the wellbore.

Ideally, fracture location and orientation, and its dimensions width, height, and length would be known values. However, as mentioned previously, there is limited data available on fracture height and virtually no method available to accurately measure an extended propped fracture length. Therefore, there has been a long-felt need in the art/industry for a logging device that can be used to generate this critical element of fracture geometry while being subjected to the elevated values of temperature and pressure (for example about 200° C., or greater, and 10,000 p.s.i.) associated with down-hole wellbore conditions. There is also a need in the art for a system that can be arranged to operate with existing wellbores that have already been perforated and fracture stimulated and newly drilled wells that may be completed according to the present invention to simplify the measurement process or to enhance its ability to describe the propped geometry generated from a fracturing treatment.

SUMMARY OF THE INVENTION

The invention provides a radar logging device/tool, system and method for determination of propped fracture length, height and azimuth (direction from the wellbore). The present invention addresses the industry need for accurate measurement of these important aspects of fracture geometry. The invention accomplishes this goal using a design expressly suited to operate under adverse conditions associated with a wellbore, as it penetrates the producing formations and its associated elevated formation temperatures and pressures.

The present invention provides a radar logging system, apparatus, and method that includes above ground instrumentation and a down-hole hybrid transceiver. Microwave signals, which are generated above ground, are used to drive an intensity modulated (IM) laser. The laser output travels along a fiber optic cable down into the wellbore.

The radar logging system includes a transceiver that may include a photodiode or has a photodiode separately connected thereto. The radar signal will locate holes/perforations in the casing and determine which holes/perforations are connected to a fracture of some propped length. Once the signal has access to the propped fracture it may also generate data that can be used to describe the propped fracture length and height. This technology can be used to describe all fractures connected to the wellbore and differentiate between the dimensions of the two vertical wings of a propped fracture. Commonly accepted theory says that most fractures are orientated in the vertical direction (the width of the propped fracture is largest at the wellbore) and that vertical fractures have two wings orientated approximately 180° from each other. In most instances (due to the inability to accurately measure fracture length) the two propped fracture wings are assumed to have similar propped geometry (length, width and height). This technology will allow actual measuring of the geometry of both wings.

Inside the wellbore, the transceiver, containing passive components that can withstand the high temperatures, such as a photodiode, converts the IM laser signal back to a microwave signal. The signal is split between an antenna and a mixer, where the output from the antenna is transmitted out into the fracture. The fracture containing proppant serves as a wave guide for the radar signal and inconsistencies in the fracture, including the fracture termination reflect the radar signal to form a reflected wave. This reflected wave is mixed to generate a beat frequency used to determine the dimensions (e.g., length) of the fracture. Advantageously, the transceiver is operable at low down-hole temperatures or high (e.g., about 200° C., 220° C. or 300° C.) down-hole temperatures without any cooling apparatus.

In an embodiment, the invention permits accurate radar logging measurements using only passive components down-hole (no amplification down-hole). The more temperature sensitive active components are above-ground and away from the high temperatures, pressures and potentially corrosive environment often associated with down-hole well conditions.

Also, the invention advantageously achieves very low loss signal transport mechanisms. For example, an embodiment has a fiber microwave feed exhibiting only a 1.2 dB RF/electrical loss per kilometer. Also, audio frequency output signal can be transported for kilometers over a twisted pair of wires with minimal loss.

A notch or slot antenna may be employed to radiate the signal outside the casing. The vertical notch is created in the wellbore casing by a high-speed saw/cutting device (or cutting laser) that can be a part of the radar logging device. The notch is created in the location that is determined by the tool as oriented toward the fracture. This notch location is determined by probing the casing perforations with a RF signal (whose wavelength is short enough to pass through a single perforation) to locate those perforations shown to be in communication with the propped fracture. Typically, the notch is approximately 5 mm to 20 mm in length. The tool orients its vertical slot antenna with the casing notch. Contact of the antenna with the casing is not required. The slot antenna of the tool and casing notch create a strong electrical coupling allowing the tool's electromagnetic signal to enter and penetrate the propped fracture.

The logging device may be positioned down-hole in conjunction with a gyroscope. The gyroscope has a dual purpose of being necessary to pinpoint the location of perforations that are found to be in communication with the propped fracture and it also provides useful information that contributes to the invention's ability to determine the azimuth/direction of the propped fracture as it leaves the proximity of the wellbore.

The gyroscope may also be used to position the above-mentioned notch that is used as an exit point for the device's RF signal.

While the notches in the casing can be made down-hole with a cutting tool or saw/cutting device, it is also within the spirit and scope of the invention that, in an embodiment, wellbore casings are manufactured with prefabricated notches that are selected/customized according to the specifics of the wellbore.

BRIEF DESCRIPTION OF THE DRAWINGS

For purposes of illustration and not intended to limit the scope of the invention in any way, the aforementioned and other characteristics of the invention will be clear from the following description of a preferred form of the embodiments, given as non-restrictive examples, with reference to the attached drawings wherein:

FIG. 5 is a schematic of an embodiment of the photodiode and transceiver portion of the radar logging device of FIG. 3 constructed for operation in a high-temperature down-hole environment;

DETAILED DESCRIPTION OF THE INVENTION

Figure 1:
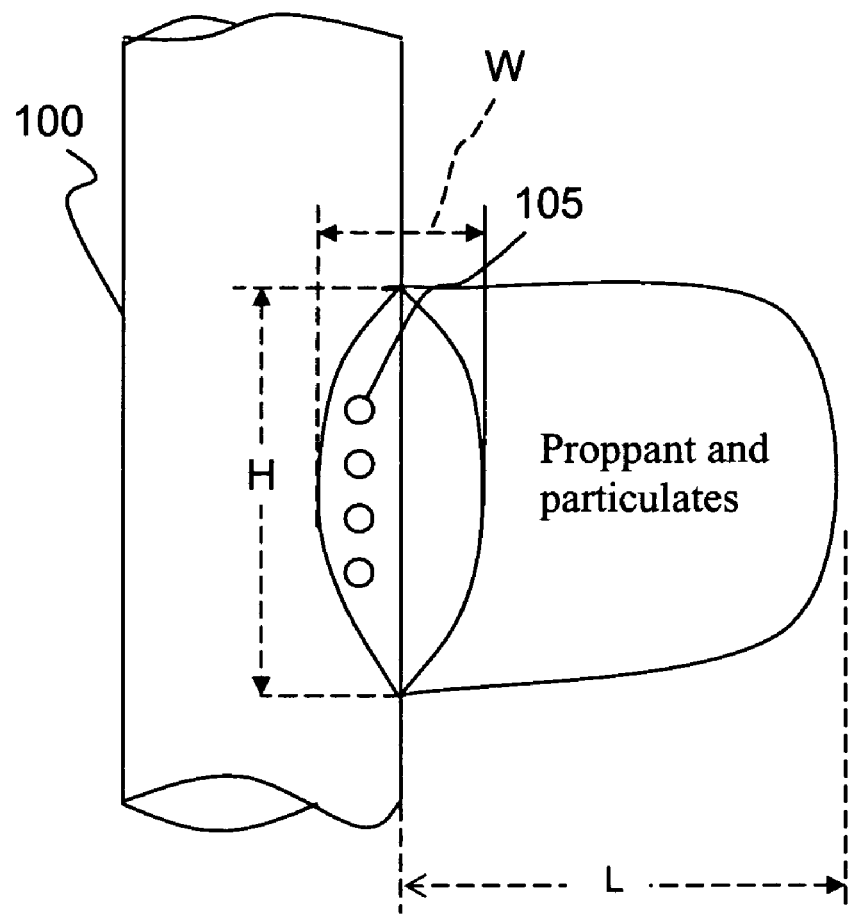
FIG. 1 is a drawing of a wellbore that is known in the art.

It is understood by a person of ordinary skill in the art that the drawings are presented for purposes of illustration and not for limitation. The embodiments shown and described herein do not encompass all possible variations of the arrangement of structure, and an artisan appreciates that many modifications can be made within the spirit of the invention and the scope of the appended claims. In the following description, well-known functions or constructions are not described in detail since so as not to obscure the description of the invention. For example, power sources, bias voltages, and their respective connections are not shown in the drawings so that the subject matter emphasized in the description is not obscured with unnecessary detail. However, an artisan understands and appreciates that any such items not shown may be advantageous and/or required for operability.

There are a number of ways that the present invention may be practiced. For illustrative purposes, we will discuss at least two methods that adapt to the respective type of casing. While newer casings can be designed with the present invention in mind, older casings/wellbores can be modified so that an antenna located down-hole will be able to transmit and receive a signal through a series of notches that are cut into the casing.

Figure 2:
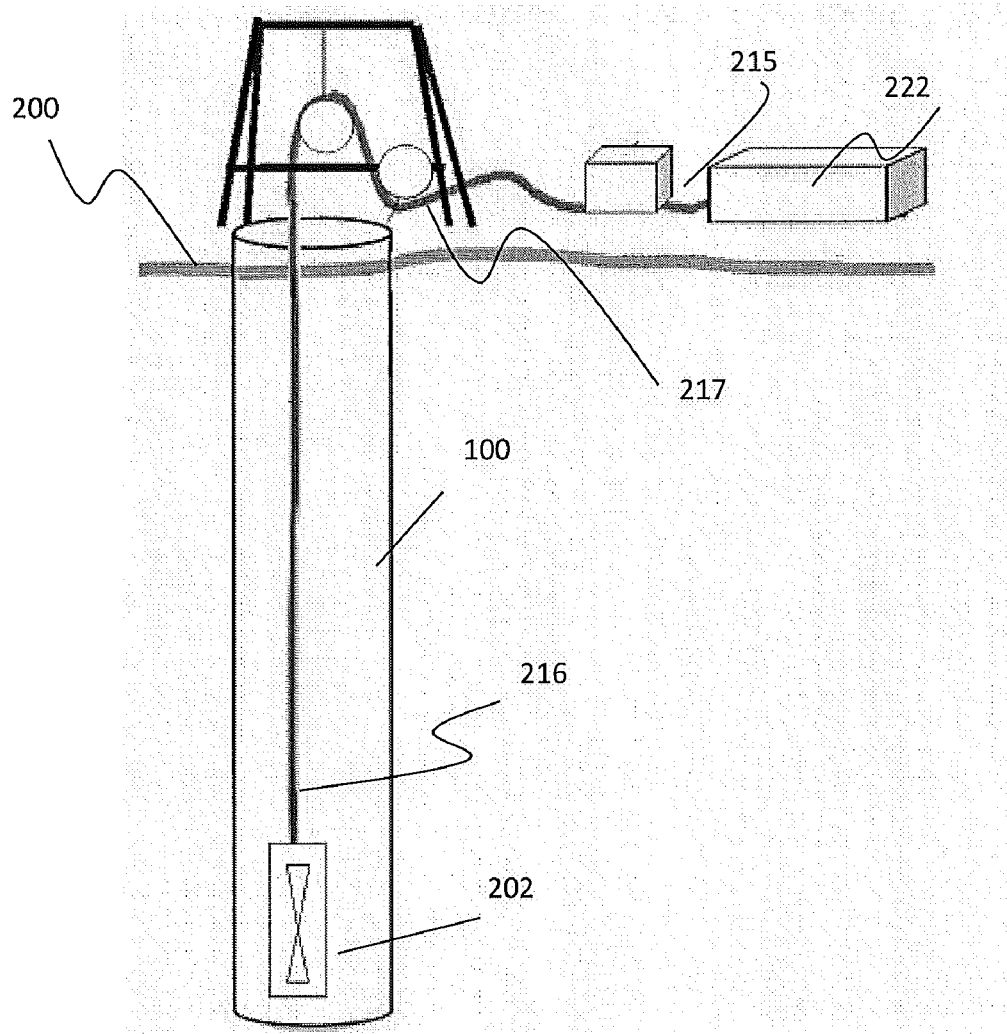
FIG. 2 is a drawing of a first embodiment of a radar logging device having a passive transceiver arranged down-hole in the casing.
Figure 3A:
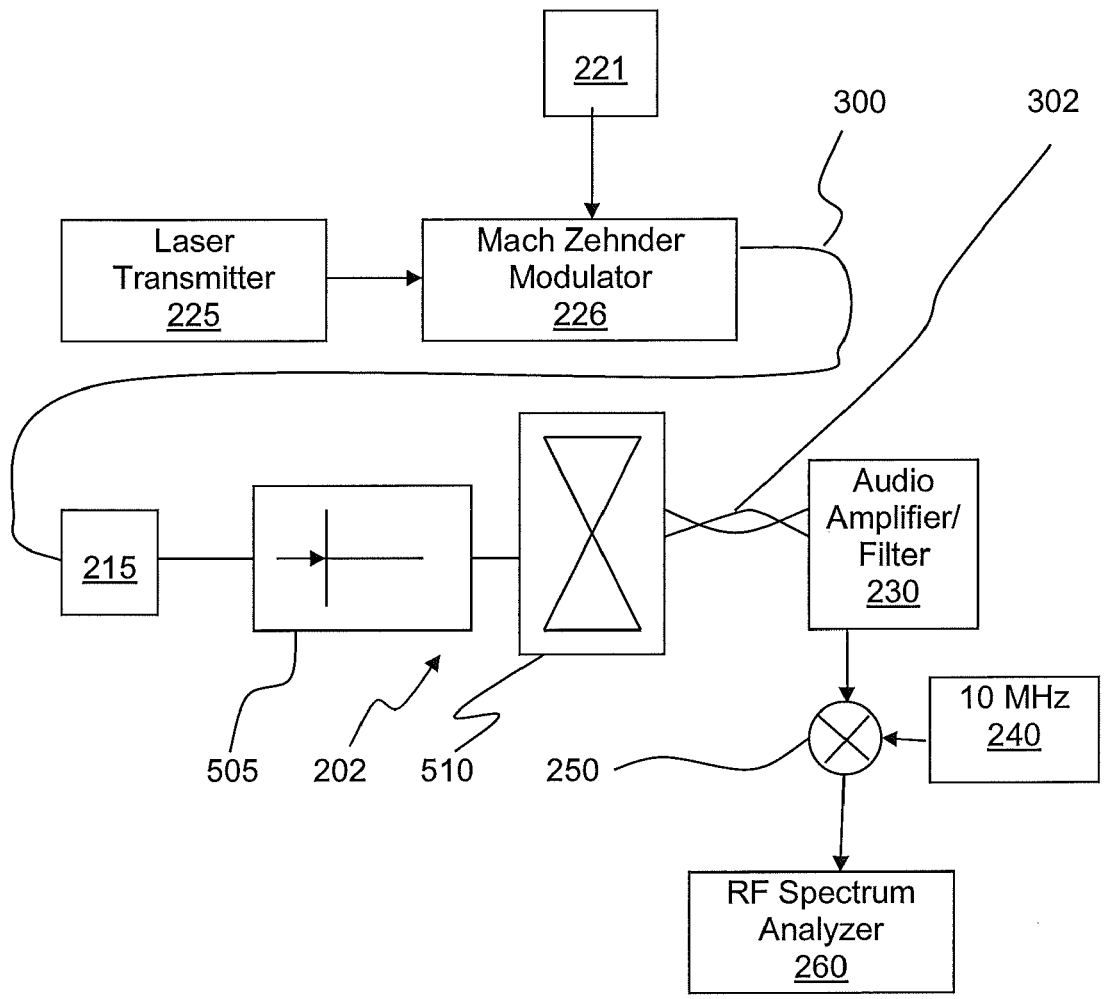
FIG. 3A is a block diagram of an embodiment of the present invention.

FIGS. 2 and 3A illustrate one embodiment of the present invention, with FIG. 3A providing a block diagram of the components shown in FIG. 2. The entire system can be arranged-in-part both above and below ground 200. With regard to FIG. 2, a wellbore is lined with a casing 100. Down-hole the temperature can be in the vicinity of 200° C., and this exceeds the temperature permissible for viable operation of typical active electronic components, which at best would require the assistance of special cooling devices in an attempt to have the device operate correctly.

Referring to FIG. 2, there is depicted a driver and instrumentation 222 connected above ground to a source 215 of cable 217. Typically, the source 215 is a roll of cable. The cable 217 is fed down-hole and has an outer rigid sheath 216 connected to a down-hole signal sending and receiving apparatus 202. Thus, the signal sending and receiving apparatus 202 only has passive components capable of operation under such conditions and is arranged down-hole and along/within a lower portion of the casing 100 of the wellbore.

FIG. 3A shows that the above ground instrumentation 222 of FIG. 2 includes a microwave signal source (microwave frequency generator) 221, a laser driver (laser transmitter) 225, a modulator 226, an audio amplifier/filter 230, mixer 250, microwave frequency generator 240 and RF spectrum analyzer 260. The microwave signal source 221, laser driver 225 and modulator 226 generate a microwave radar signal, and couple the signal to an IM laser to modulate laser light to be sent down-hole. For example, microwave radar signals are generated above ground and intensity modulated (IM) onto a 1550 nm laser signal. An audio amplifier/filter 230, mixer 250, microwave frequency generator 240 and RF spectrum analyzer 260 are also situated above ground and act as an audio frequency receiver and signal processor so as to receive from down-hole a beat frequency. The microwave generator is typically configured to generate two signals with different frequencies such that a beat frequency will be generated in the transceiver's mixer. Likewise, the microwave generator may be chirped in order to generate a beat frequency in the transceiver's mixer. The beat frequency characterizes certain fracture geometry properties, in particular fracture length, to provide logging data consistent with the propped fracture system that has been generated.

FIG. 3A also shows a cable roll 215 (above ground) and a signal sending and receiving apparatus 202. The signal sending and receiving apparatus 202 includes a photodiode 505 and a transceiver 510. In particular, the photodiode 505 converts the IM laser light back into a microwave signal, with the output of the microwave signal source 221 being in the range of about 1 GHz to 10 GHz but typically about 1 GHz (e.g. 0.5 to 2 GHz or 0.7 to 1.3 GHz). It should be noted that the examples, drawings, and descriptions are all for the 10 GHz realizations and are provided for illustrative purposes and not intended to limit the scope of the invention. The modulator 226 is connected to the photodiode 505 by optic fiber 300, typically polyimide coated optic fiber. The transceiver 510 is connected to the audio amplifier/filter 230 by a pair of twisted wires 302. The twisted pair 302 may also carry the DC bias for the photodiode 505. (In an alternative embodiment (not shown) the DC bias for the photodiode can be carried on a separate pair of wires.) The photodiode 505 can be connected to the transceiver 510, for example, by a coaxial cable. However, the photodiode may be included as part of the transceiver assembly by mounting the photodiode directly onto the transceiver (not shown).

Microwave signals, which are generated above ground by the microwave signal source 221 (e.g. radar signal source), are used to drive a laser intensity modulated (IM) by intensity modulator 226. The laser output travels along the fiber optic cable 300 down into the wellbore.

Inside the wellbore, a transceiver 510 containing passive components that can withstand the high temperatures converts the IM laser signal back to a microwave signal (e.g. radar signal). The radar signal is split between an antenna 512 (FIG. 5) and a mixer 520 (FIG. 5), wherein the output from the antenna 512 is transmitted out into the fracture. The fracture, which contains proppant, serves as a wave guide for the radar signal. Inconsistencies in the propped fracture, including the propped fracture's change in direction or termination, reflect the radar signal to form a reflected wave. This reflected wave is mixed in the diode mixer 520 to generate a audio frequency, such as a beat frequency, to determine the dimensions (e.g., length) of the fracture.

It should be noted that while there could be various implementations of the components shown in FIG. 3A, the functionality would be similar. For example, while it is preferred that the invention mixes the reflected wave with the source wave to generate a beat frequency, an artisan appreciates that a signal other than a beat frequency (based on a mixing of the waves) can be generated in order to calculate the size of the fracture. Also, in FIG. 3A the transceiver 510 functions as a transmitter and receiver unit. However, in embodiments, not shown, the transmitter and receiver unit could be a separate transmitter and receiver each having their own antenna and in communication with different photodiodes. Also, rather than sending a single signal from a single radar signal source, multiple signals from multiple radar signal sources can be employed. For example, a transmitter could employ one source radar signal and a receiver could employ a second source radar signal or a transceiver could be fed two source radar signals, one to operate with transmitter components of the transceiver and another to operate with receiver components of the transceiver.

Figure 3B:
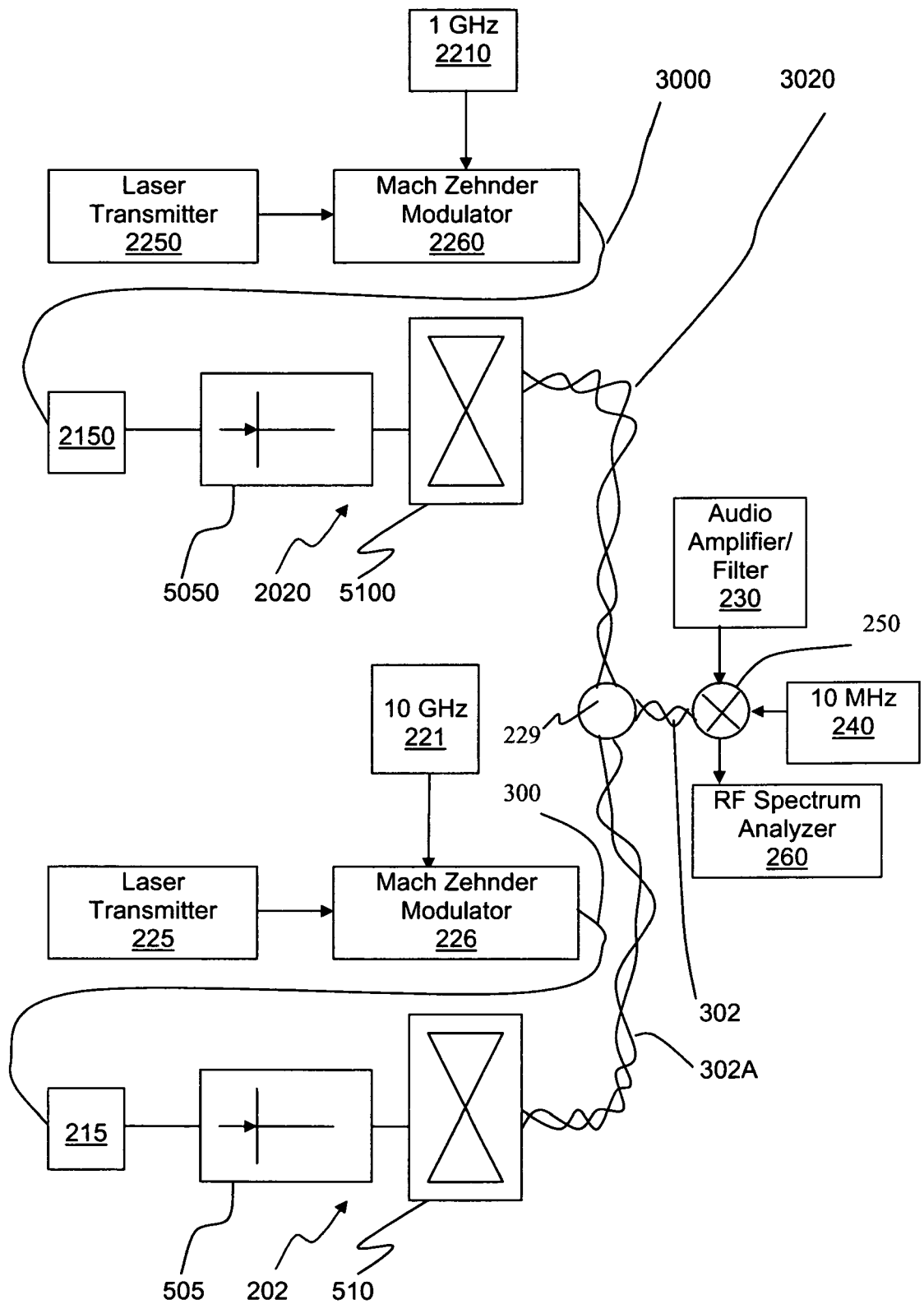
FIG. 3B is a block diagram of another embodiment of the present invention.

FIG. 3B illustrates another embodiment of the invention including a second radio system. The second radio system is similar to the one shown in FIG. 3A, however it generates a different frequency. The use of two separate radios facilitates employing two different microwave frequencies. The first frequency (e.g. about 7-12 GHz, typically about 10 GHz) is used to orient the tool and detect perforations (that are in communication with the propped fracture). The second frequency (e.g. 0.5 to 2 GHz, typically about 1 GHz) about is used for transmission via a notch or slot antenna to determine the fracture dimensions, (e.g. fracture length, width, and/or height). The reference numerals shown in FIG. 3B are the ones used in FIG. 3A except that an additional digit has been added at the end to show each component in the second radio has a reference numeral ten times that of a similar component in FIG. 3A. It should be noted that the radar source, optical source and optical modulator are duplicated. In an alternative embodiment (not shown) the radar source, optical source and optical modulator are not duplicated.

Still referring to FIG. 3B, the first and second radio systems, which are typically located above ground except for the signal sending and receiving apparatus 202, 2020, use the same twisted pair 302 to carry the audio signal generated down-hole by the signal sending and receiving apparatus 202, 2020 which receives the source radar signal from each transceiver 510, 5100 and each respective reflected wave. There can be a simple switch 229 or any other type of coupling connection that functions to allow the same twisted pair 302 to communicate via wires 3020 and 302A with both the 1 GHz system and the 10 GHz system, respectively.

Installation Phase

In addition, the logging device can be arranged (at least partly) down-hole in wellbores that would require modification of existing casings, or customized casings can be constructed to permit an antenna to transmit the signal toward the fracture. Some of the installation steps and the modifications to the structure of the logging device that assist in this process are described below.

As shown in FIG. 3B and discussed above, there are two radios, each with its own fiber optic cable 300, 3000. In this case, a common twisted pair 302 carries an audio signal. However, if desired the common twisted pair could be replace by two twisted pairs. Depending on preference, an artisan appreciates that the same twisted pair can be used for both transceivers, or a separate twisted pair can be used for each transceivers. Additionally, it is also preferable (but not required) that there are two complete transceivers down-hole.

Figure 3C:
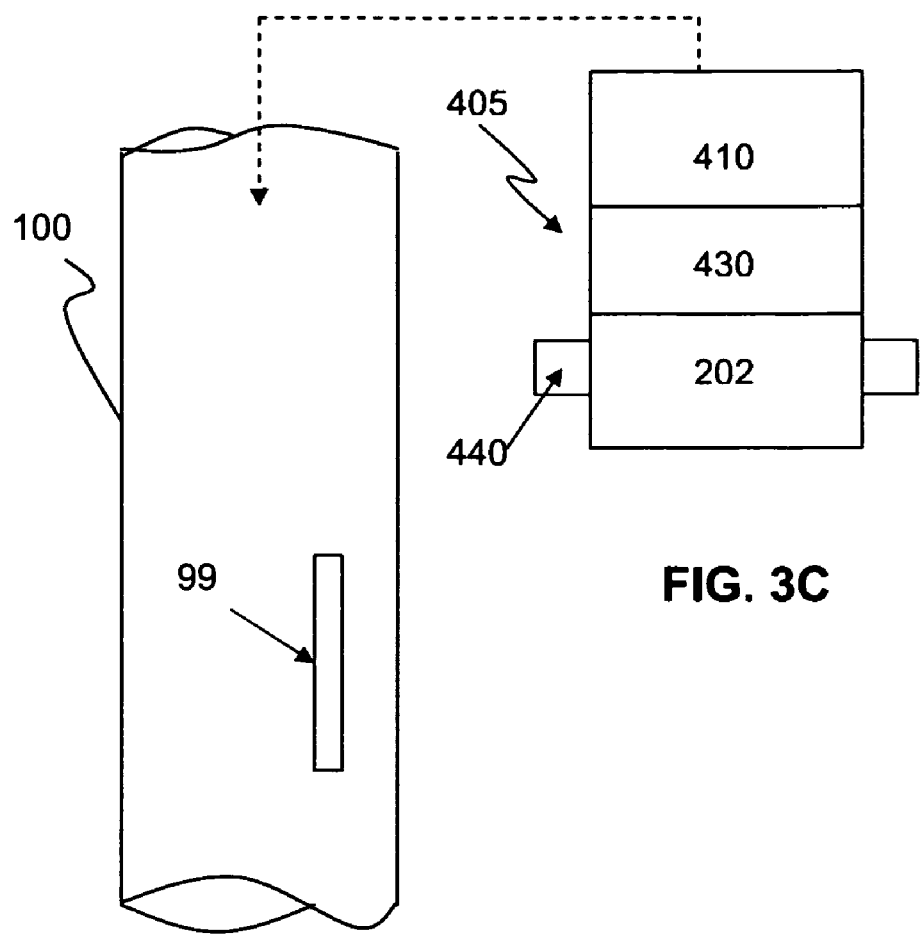
FIG. 3C shows the cutting tool and a wellbore with existing perforations.

FIG. 3C illustrates the items schematically other than the transceivers 510, 5100 shown in FIG. 3B, which are used to orient and install the logging device in a casing already installed down-hole. These items include a gyroscope 430, a retractable cutting device 410 (e.g. high speed saw/cutting device or laser) capable of accurately generating a narrow slit/slot (of a prescribed length) in the casing, attachable hardware such as retractable anchors 440 (two shown) to hold the tool stationary, and the ability to create and store data concerning the position of existing perforations and to position accurately the cutting device to create/cut a slot intersecting a given perforation.

Notch Created Down-hole using Perforations and Gyroscope

FIG. 3C shows a further embodiment of the device 405 which includes the signal sending and receiving apparatus 202, as well as a gyroscope 430 and a cutting tool 410. It should be noted that the cutting tool could be anything from a saw to a laser. In the case of wellbores with existing perforations, the process includes creating a vertical notch in the casing to facilitate transmission of the signal for determining the dimensions of the fracture.

To determine the location for placing the notch in the casing, the device 405 transmits a signal to locate casing perforations connected to a proppant packed fracture (of at least several meters). Once such perforations are found, the saw or cutting device 410 (which may comprise a laser) cuts a vertical slot or notch 99 in the casing (dissecting the perforation). The slot is designed to be sufficient in size to allow a lower frequency signal (suitable to make the trip down the fracture and back to the transmitter/receiver) to travel from within the casing to the propped fracture. During the cutting, the gyroscope 430 assists in positioning the cutting device 410 (e.g. high-speed saw or laser) for cutting the slot or notch.

Figure 3D:
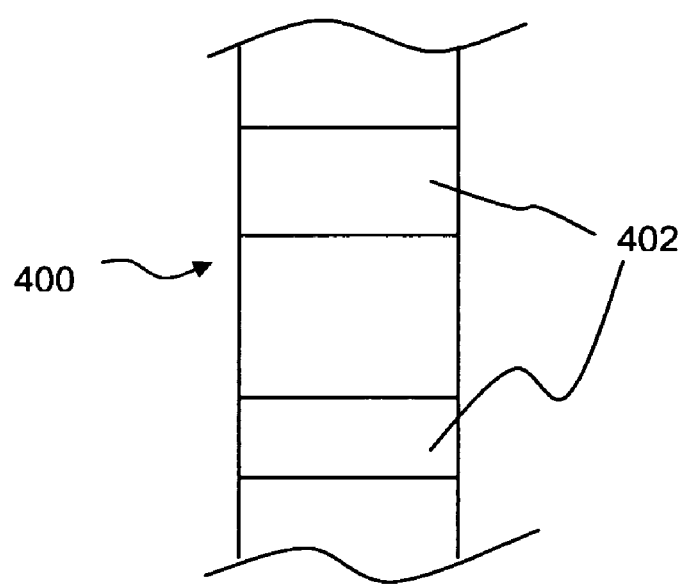
FIG. 3D illustrates a wellbore according to an embodiment of the invention that includes composite pups.
Figure 3E:
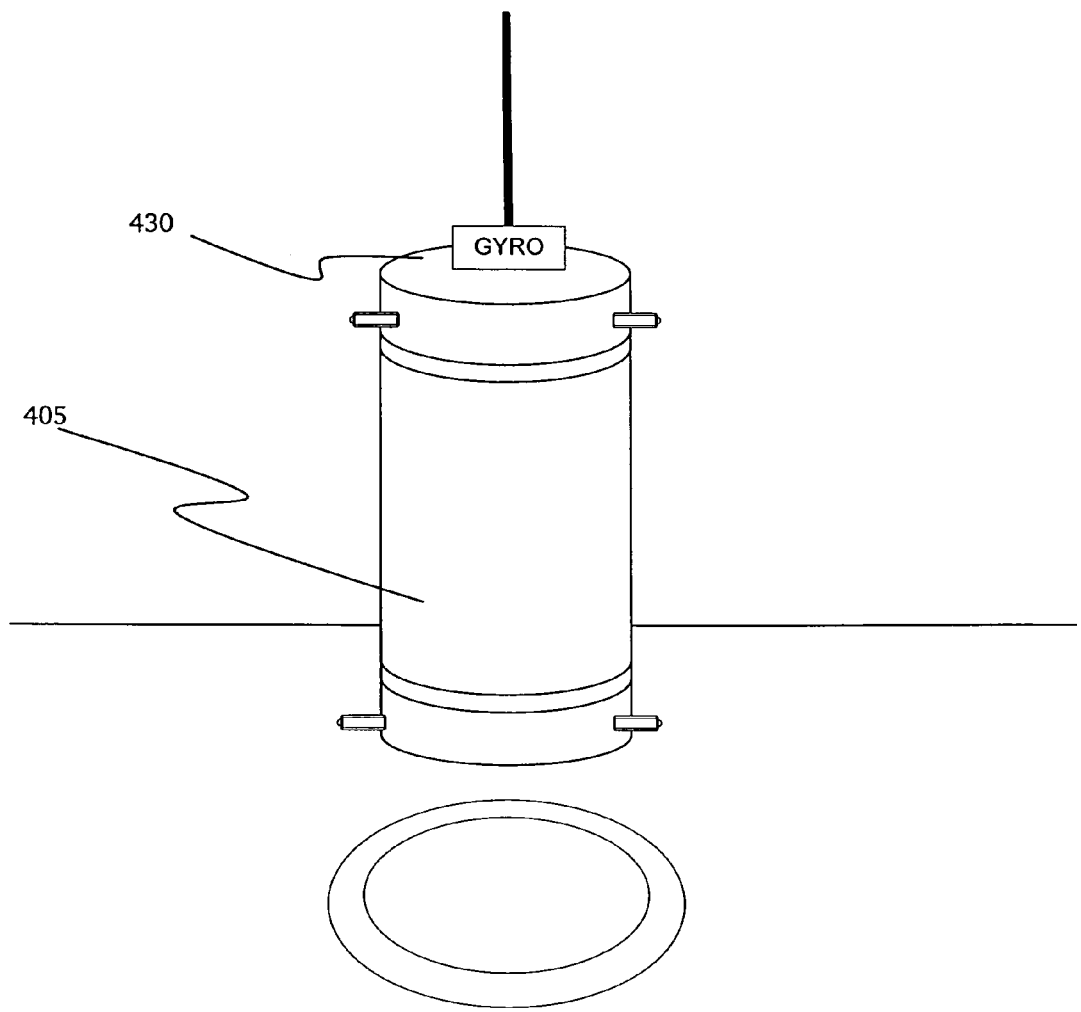
FIGS. 3E-3K illustrate one way that a logging device according to the present invention would be lowered into a wellbore, having articulated arms locking the device in place and taking readings at both 10 GHz and 1 GHz.
Figure 3F:
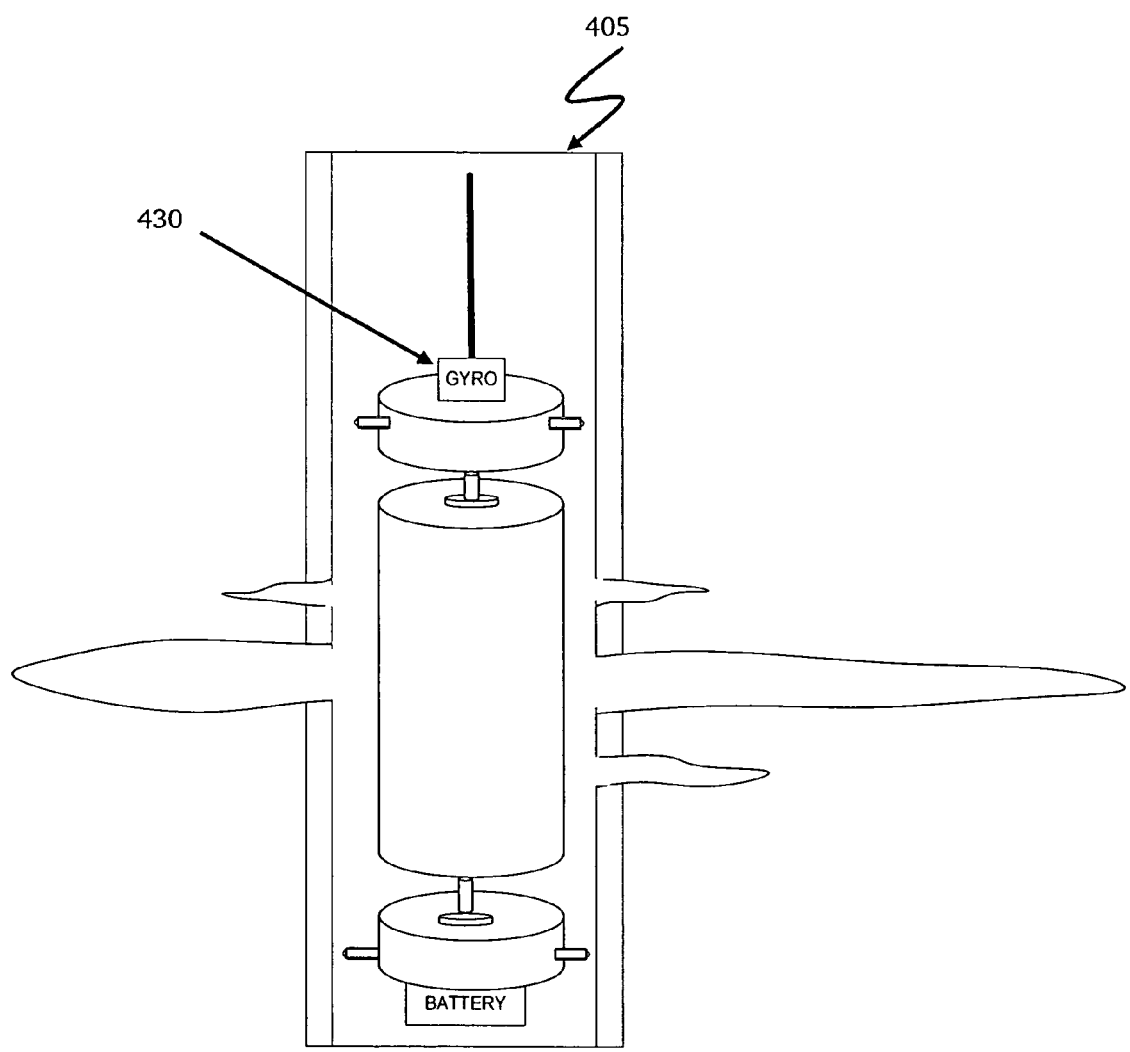

In accordance with FIGS. 3E-3K, one way that the present invention can be lowered and situated down-hole for operation is as follows:

(a) As shown in FIG. 3E, the tool is lowered into the well to the depth to be examined, which is the where series of perforated intervals are arranged. The tool ends up at the depth shown in FIG. 3F.

Figure 3G:
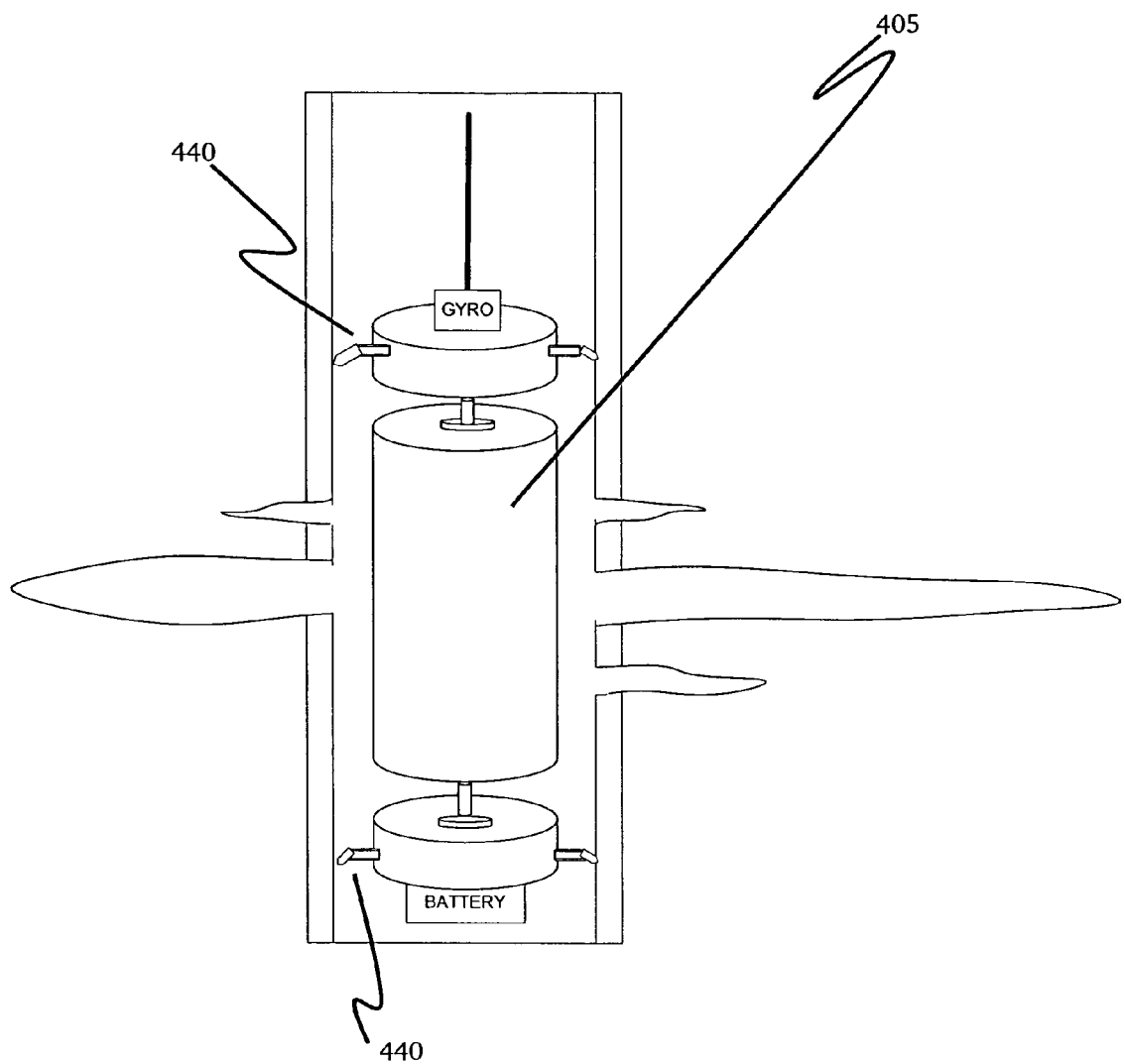

(b) FIG. 3G shows the tool is then anchored in place by attachable hardware such as retractable arms, or an electromagnet.

Figure 3H:
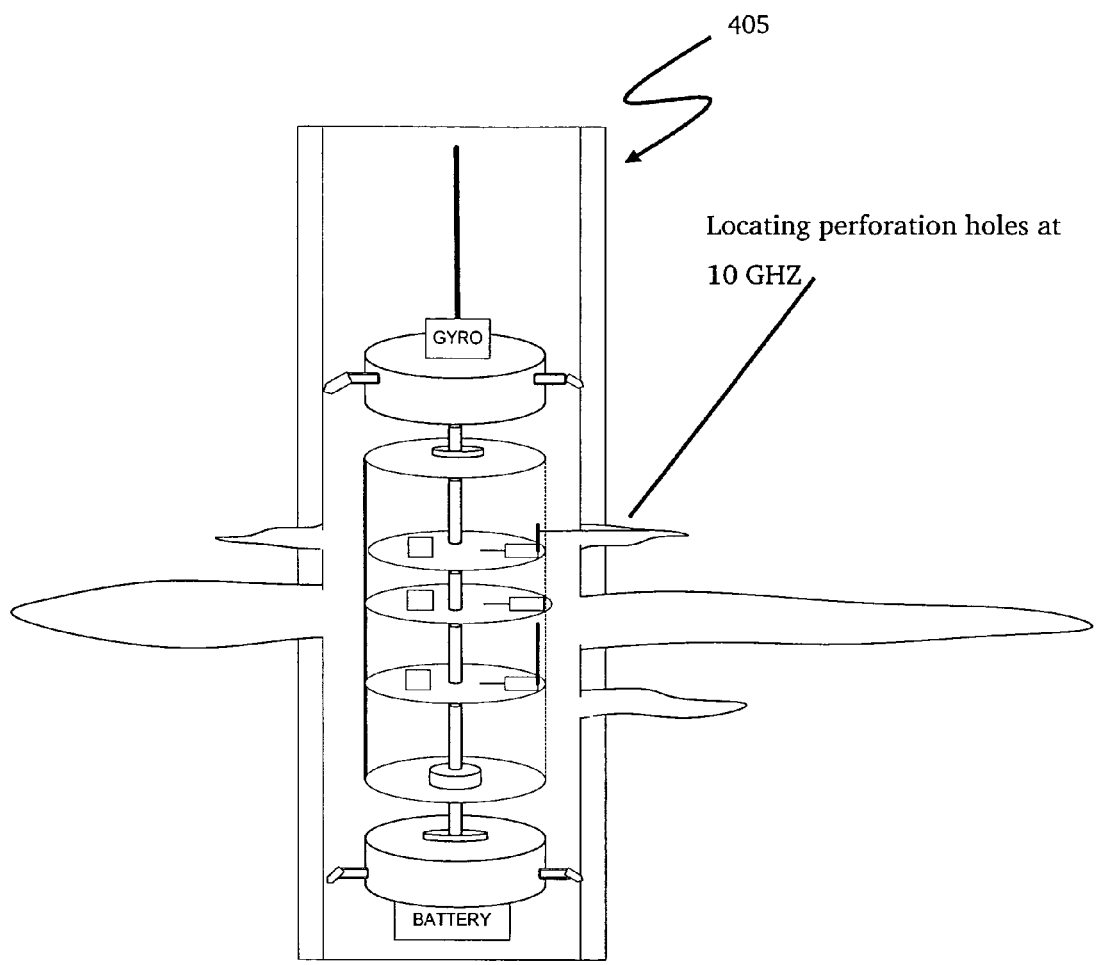

(c) As shown in FIG. 3H, using the gyroscope and a 10 GHz signal from the GHz radio, the tool scans the casing for perforations.

(d) As perforations are located, data from the return of an approximate 10 GHz signal is gathered and analyzed (data being transmitted to the well surface through the twisted pair). From the aforementioned data, it is determined which perforations are connected to a propped fracture of at least minimal length.

Figure 3I:
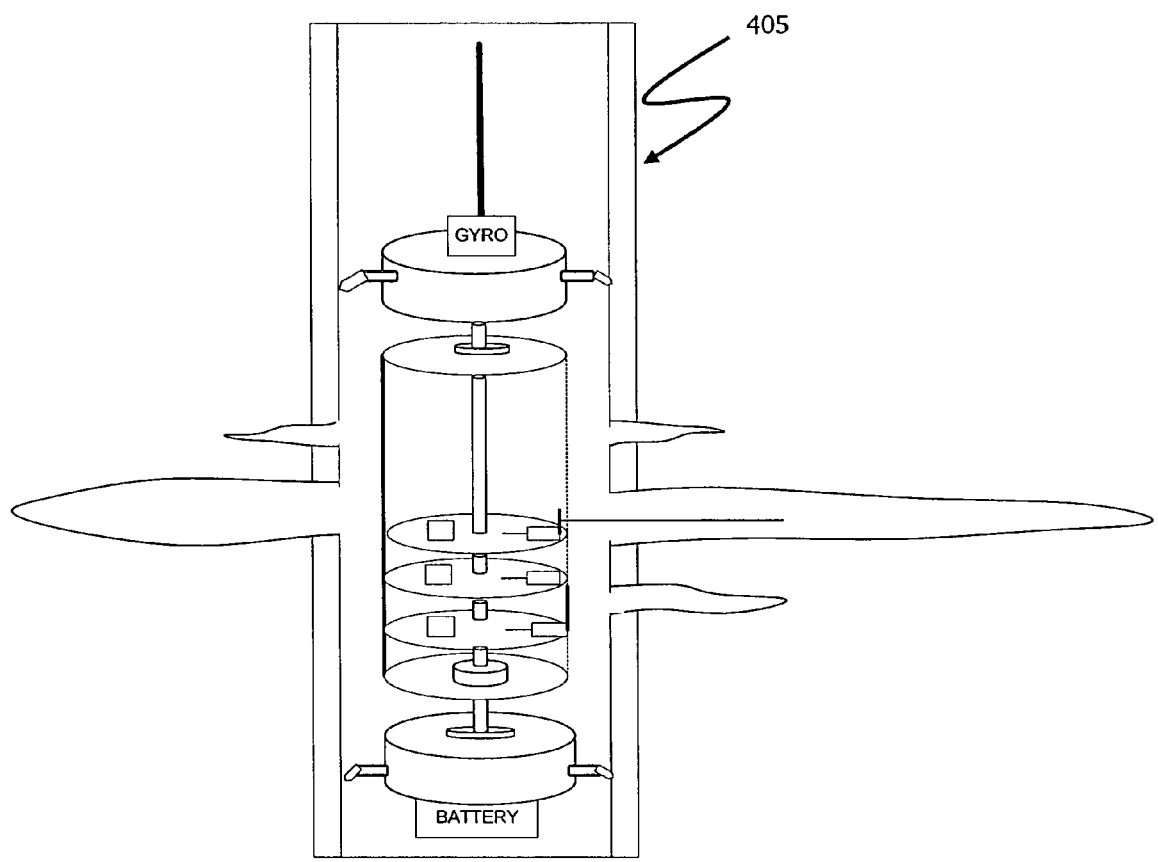

(e) As shown in FIG. 3I, once each of the perforations has been examined, then the cutting part of the tool is positioned so that a 10-15 cm narrow slot can be made to dissect the perforation (identified as connecting to a propped fracture).

Figure 3J:
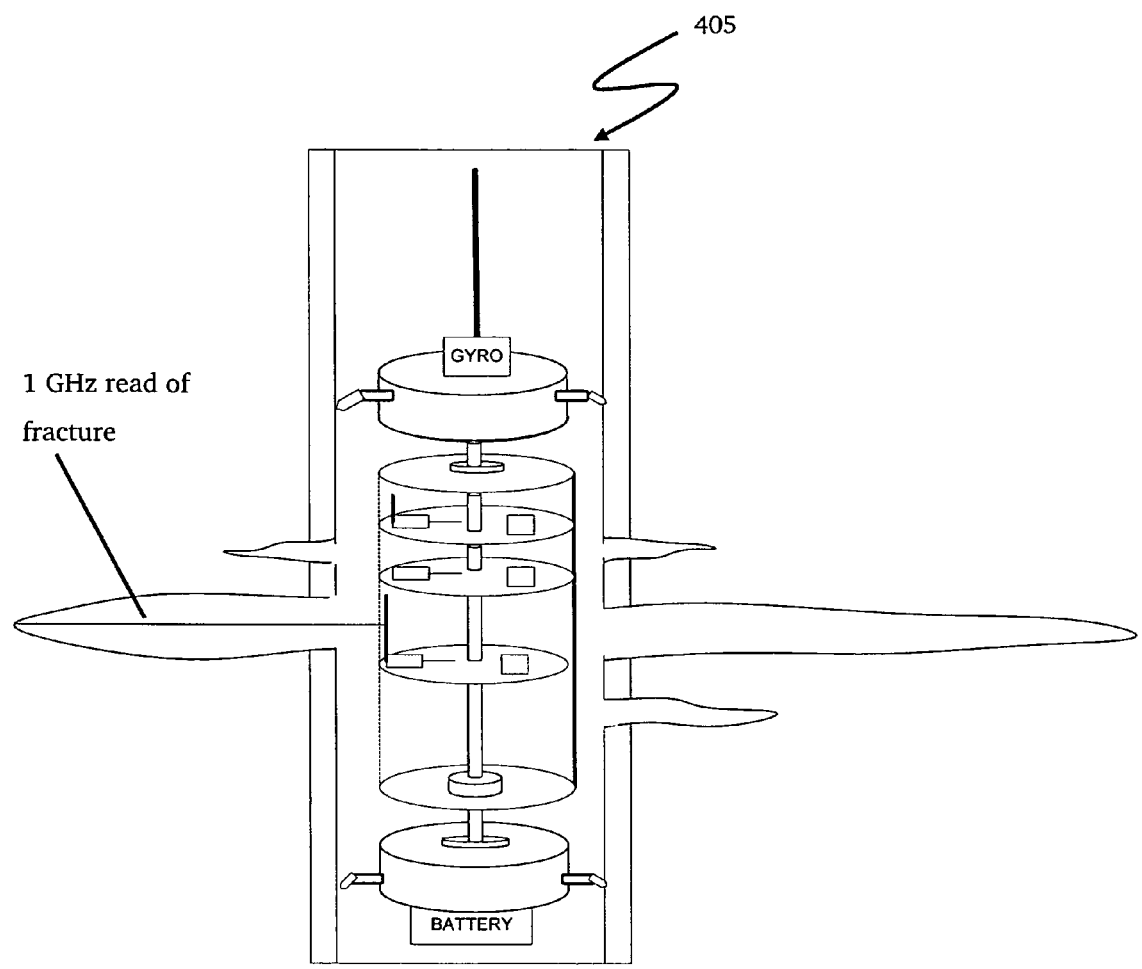

(f) As shown in FIG. 3J, once the narrow slots are in place, a 1 GHz signal is pulsed or otherwise sent through the narrow slot and out into the connecting propped fracture. Data concerning the returning signal waves is transmitted back to the surface for analysis. By repeating steps (e) and (f), the geometry of all propped fractures intersecting the wellbore and in communication with a perforation can be examined and a fracture configuration can be developed.

Figure 3K:
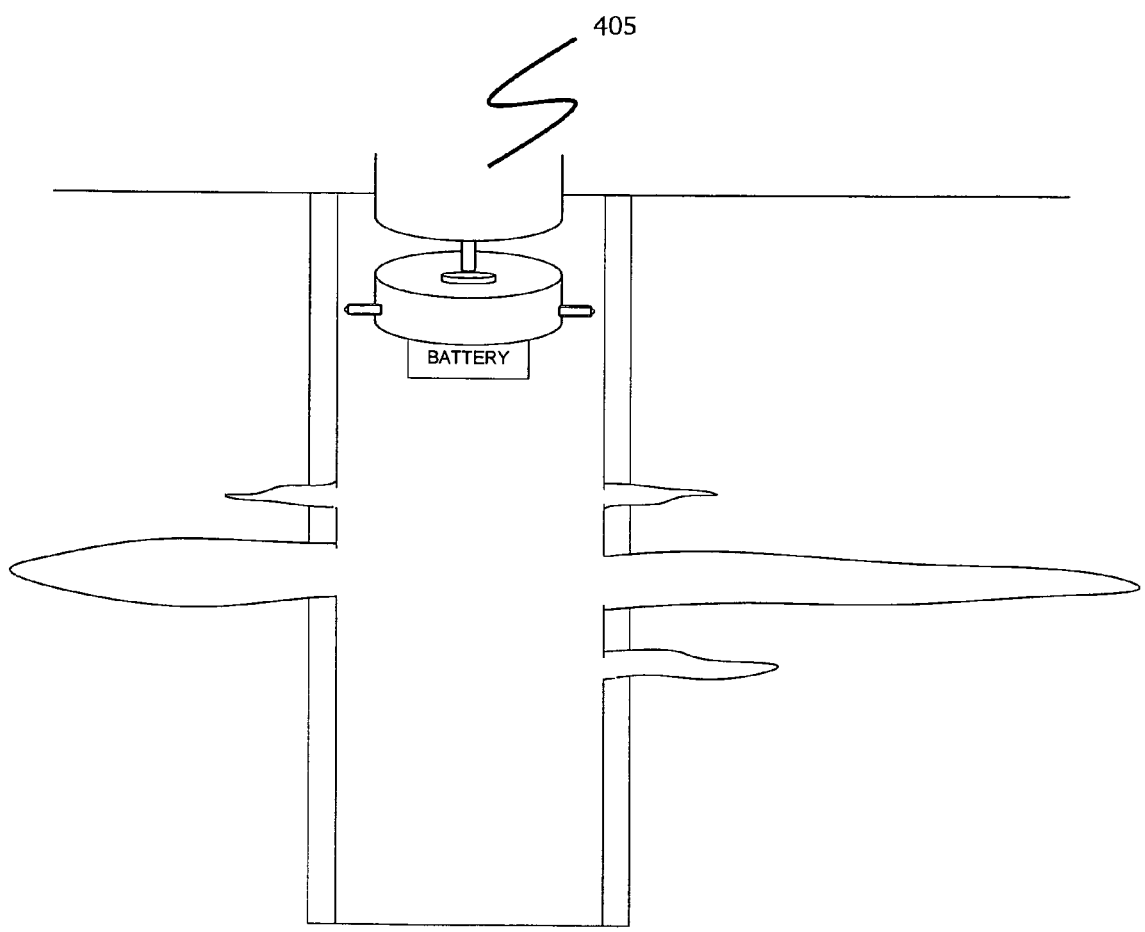

(g) After the fracture geometry is measured, the tool can then be raised out of the wellbore, as shown in FIG. 3K.

Using a similar procedure to steps (e) and (f) above, the fracture height can also be established. In this case, the saw/cutting device 410 would be positioned to cut narrow slots above and/or below the first or last perforation to be identified as being in communication with the propped fracture connected to the fracture. These narrow slots (above or below the communicating perforation) can be used to establish if the propped fracture extends past the perforation in question.

In addition, the use of this technology/logging device is simplified when all or at least portions of the casing are made of composite material which is relatively transparent to the signals. This procedure, in which a signal can be transmitted through composite casing material, is a variation upon the embodiment discussed above and would be particularly applicable to new wells. Old wells are typically built without these composite sections. However, a customer building a new well can decide to include composite casing material to facilitate employing the present invention to determine the created fracture geometry of the well.

For example, new casings 400 (as shown in FIG. 3D) being arranged down-hole can be made to include portions, referred to as pup-joints or "pups" 402 made of composite material.

The composite pup-joints 402 comprise lengths of casing referred to in the art as "subs" arranged along the length of the casing and adjacent to the producing formation. The subs are prefabricated for use with such new casings.

These composite pup-joints (made of subs) would be substantially transparent to the RF signal being directed at the fracture area and could simplify locating the position of the fracture. The composite pup-joints 402 permit the signal from the logging device 405 to penetrate through the composite pup-joints 402 and pass into the propped fracture about the wellbore casing without the need for a slit or other opening in the casing. Thus, a cutting saw/cutting device 410 (or similar device) is not needed to see through the composite pups. Typically, at least 80%, preferably at least 90%, of the RF signal passes through the composite material.

An advantage of arranging the composite pup-joints in the casing is that the composite material makes it easier to position the logging device.

Also, an advantage of arranging the composite pup-joints in the casing is that the logging device could be fully functional for sending a signal through the composite pups with only a source having an approximately 1 GHz signal, e.g., 1 GHz±0.1 GHz. Thus, the approximately 10 GHz signal, e.g., 10 GHz±1 GHz, and the cutting saw/cutting device 410 would not be used when transmitting a signal through the composite pups. However, a transceiver for the approximately 10 GHz signal and the cutting saw/cutting device 410 may be included, even if being used with a casing including composite pups, in the event the logging device is also to be used to send a signal through parts of the wellbore casing not made of composite pups.

In an embodiment of the invention, for maximum definition of the fracture height and length, the production interval can be completed using only composite pipe (instead of the combination of composite subs and conventional casing). In such an example it would be possible to scan the entire production interval without interruption.

Typical composites are fiber glass reinforced-cured epoxy resins. To maximize the geometry data obtained through the use of this invention, all or a substantial portion of the casing, positioned adjacent to the producing interval, may be made of composite material. An example of such composite material is RED BOX fiberglass reinforced aromatic amine cured epoxy resin casing and tubing available from Future Pipe Industries. Such casing and tubing is designed for downhole service of medium to high pressure at depths as great as 13,000 feet.

Additionally, the use of composite pup-joints or joints permits one to check above and below the zone of interest to see if the top and bottom of the propped fracture have been located, to provide accurate height determination.

In contrast, employing the method of the present invention on casings made without the composite pup-joints, such as existing casings already installed down-hole that are cemented across the treating interval, normally includes an additional step of using the cutting saw/cutting device 410 to enlarge the perforations 105 already in the casing 100 (as shown in FIG. 1) to a desired size for transmitting a signal therethrough.

Figure 4:
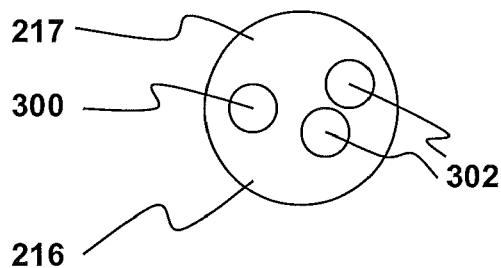
FIG. 4 is an illustration of the communication cables used in the embodiment disclosed in FIGS. 2 and 3A, 3B; photodiode bias wires normally included in this embodiment are not shown to simplify the figure.

FIG. 4 shows the cable 217 of FIG. 2 has within its outer rigid sheath 216 both a fiber optical cable 300 designed for high temperature use, and typically, a twisted pair of cables 302 to return an audio signal above ground. The twisted pair is used as a return for the audio frequency (in this case beat frequency) created by the difference of the original signal and the signal reflected off the fracture. The fiber optical cable 300 is typically a polyimide coated fiber cable on which the modulated optical fiber is sent down-hole to the transceiver. RF power losses are on the order of 1.2 dB/km of high temperature tolerant fiber. The twisted pair typically has TEFLON coated wires. The photodiodes also are provided with DC bias voltage (not shown), which could be sent to the photodiodes over another twisted pair of wires (not shown).

Although an artisan will understand and appreciate that other values can be substituted, the invention has been designed using as many "off the shelf" components as possible to aid in manufacturing ease and reduce costs. For example, the optical fiber selected was a high temperature polyimide coated mode 1550 nm fiber and can withstand the 200° C. and above temperatures. In addition, intensity modulators that operate in the 1550 nm wavelength range are available. There are also many lasers that operate with sufficient power at the 1550 nm wavelength range. Moreover, there are Erbium-doped fiber amplifiers available that can provide further optical amplification of 1550 nm signals should more optical power be required.

With regard to FIG. 3A, a typical modulator 226 may be a Mach Zehnder modulator that is the industry standard modulator for microwave frequencies. An example of a suitable Mach Zehnder modulator is a JDS Uniphase Lithium Nobate electro-optic modulator that converts optical phase modulation into intensity modulation via an optical interferometer (a Mach Zehnder interferometer). The typical insertion loss into a Mach Zehnder modulator is just over 3 dB (optical). Thus, if the loss in the fiber is 0.6 dB/km, then in a setup with 1 km of fiber, the loss will be 0.6 dB.

It should be noted that virtually any type of signal propagation can be compatible with the present invention. For example, a pulsed wave sent in bursts, or a continuous-wave (such as in a Doppler system), and/or the signal may comprise a chirp that increases or decreases in frequency, linearly or geometrically. An artisan appreciates the use of these and/or other known systems as being within the spirit of the invention.

TABLE 1 is an overview of the operation of an embodiment of the invention along with a discussion of the methods steps. In particular, TABLE 1 identifies as steps some of the functions that are performed by the logging system, and notes whether these functions occur above ground or down-hole.

TABLE 1

| | Operation and Method Steps | Where Steps Are Performed |
|---|---|---|
| STEP A | Generate Radar Signal | Above Ground |
| STEP B | Modulate IM LASER With Radar Signal | Above Ground |
| STEP C | Transmit Modulated Optical Signal along a fiber cable to a Photodiode Down-hole | Above Ground |
| STEP D | Optical Signal Converted to Radio frequency signal | Down-Hole |
| STEP E | Frequency split, part to RF Antenna to reflect off fracture, other part sent to diode mixer | Down-Hole |
| STEP F | Diode Mixer mixes the two signals, and generates an Audio Frequency Signal having a beat frequency | Down-Hole |
| STEP G | Audio Frequency Signal transmitted without Amplification over a twisted pair of wires to above ground receiver | Down-Hole |
| STEP H | Compilation of the recorded reflections, e.g., Conversion of beat frequency into logging data regarding measurements of the fracture | Above-Ground |

FIG. 5 is a schematic of the photodiode 505 and transceiver portion 510 of the radar logging device that is constructed for operation in a high-temperature down-hole environment. The photodiode 505 converts the IM laser signal into a microwave signal. The microwave signal output 504 from the photodiode 505 is then split between an antenna 512 and a diode mixer 520. The portion of the signal that is sent to the antenna 512 propagates out through the propped fracture and is reflected from inconsistencies in the fracture, including a change in direction or fracture termination. The reflected signal then returns to the antenna and via the hybrid coupler 515 is sent to the mixer 520 for mixing with the original microwave signal. A beat frequency is generated which is used to determine the range. If the microwave signal is chirped, the beat frequency will correspond to the length being measured. The casing has a series of perforations/slots large enough to permit a radar transmission from the antenna. There can be a series of perforations in the casing, and it is possible to use an antenna array, with each antenna in the array transmitting via a perforation.

The use of the beat frequency to determine the range is a principle similar to the principle of many modern police radars, and even garage door opening systems. The greatest recorded range with a significant return corresponds to the length of the propped fracture being measured.

An artisan will appreciate that other methods of coding the microwave signal, such as direct sequence coding, can be employed within both the spirit of the invention and the scope of the appended claims. For example, in the case of direct sequence coding, the outgoing signal is modulated by a digital code with tightly controlled auto-correlation properties. After the signal is propagated out to a target and is reflected back, the mixer will correlate the original signal with the delayed received signal. The source signal can then be controlled to give a correlation peak at only one particular range (delay). Thus, range gated radar measurements can be made with direct coding in lieu of using a chirp. The aforementioned are two of several ways to measure the fracture.

Figure 6:
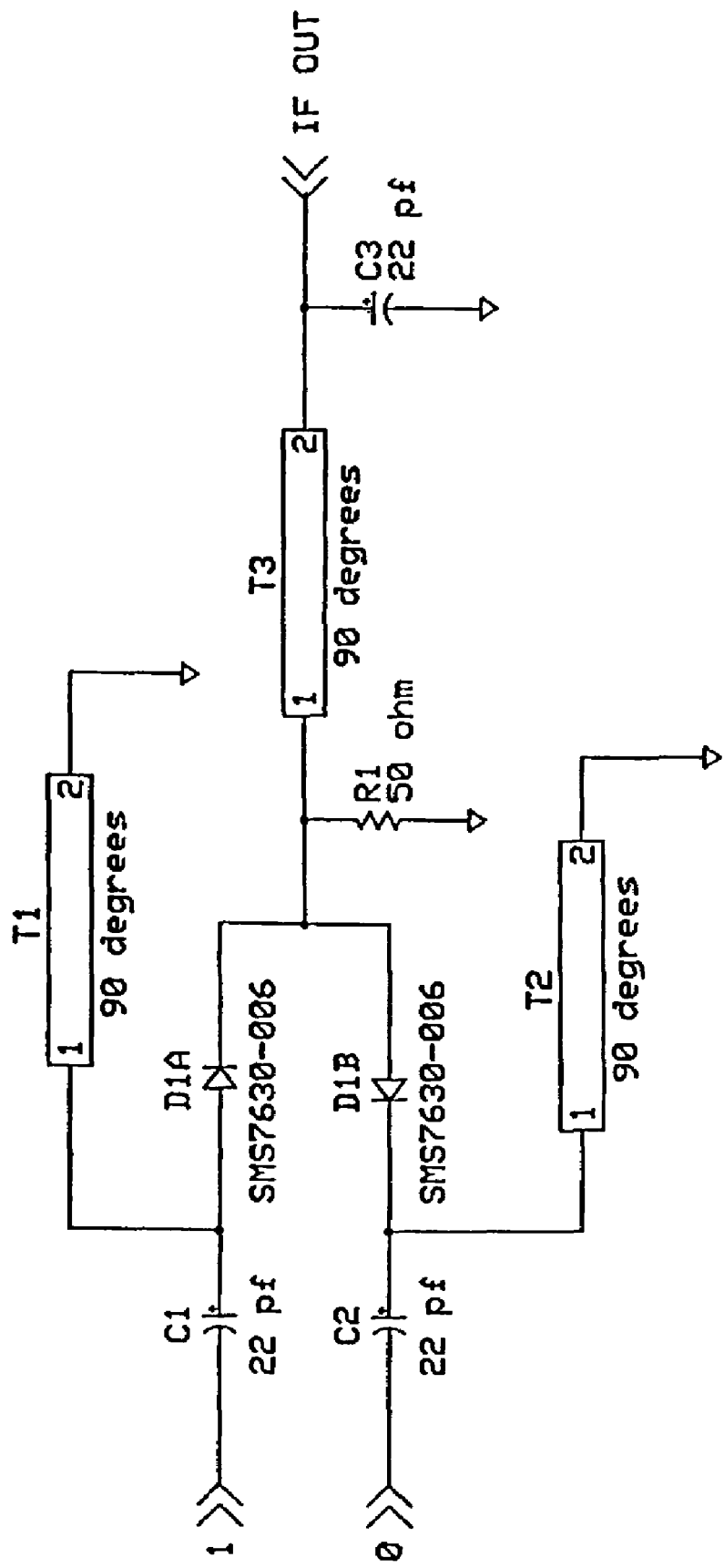
FIG. 6 is a schematic of an embodiment of the mixer that is part of the transceiver shown in FIG. 5.

FIG. 6 shows a schematic of the diode mixer 520 that is part of the transceiver 510 shown in FIG. 5. The I and Q ports are each populated with zero bias RF mixing diodes to form a single balanced mixer configuration. Such detail has been provided merely for illustrative purposes and not to limit the structure of the mixer 520 to the components shown, or equivalents thereof.

An example of typical diodes D1A, D1B for use in the mixer 520 include Skyworks Semiconductor SMS7630-006 diodes which are low bias diodes and provide high conversion efficiency (12 dB conversion loss) when operating these diodes D1A, D1B with zero DC bias. T1 and T2 are used to provide a DC ground to the diodes D1A, D1B, and R1, T3 and C1 provide a match to the mixer output port. Still referring to FIG. 6, the output of the diodes D1A, D1B is an audio frequency difference signal that is sent to the surface through the twisted pair of wires 302 (from FIG. 4). The frequency is typically on the order of MHz whereas the microwave signal input is typically between less than 1 GHZ to 10 GHz.

Circuit topology could change if the frequency is changed. For example, the transmission line that could be employed with a 10 GHz system could be replaced with direct inductors in a 1 GHz system. Also, the hybrid coupler employed in a 10 GHz system could be replaced by having the mixer itself couple part of the signal to the antenna. In other words, while operation at different frequencies is substantially the same, different components may be used at different frequencies that are better suited to the particular frequencies.

Typical Materials Useful For Determining Fracture Geometry

The invention measures aspects of propped fracture geometry. Propped fractures provide a conductive pathway for the flow of hydrocarbon and they are designed to be stable in their environment.

Typical suitable proppants include sand, ceramics and resin coated sand and ceramics to prop fractures.

It is possible to mix additive particles/filler with proppant and a variety of additives and/or fillers can be used for determining the geometry of the fracture. The additives and/or fillers (hereinafter additives and/or fillers will be termed "particles") can be electrically conducting, semi-conducting or electrically non-conducting. However, the particle size of the additive particles/filler should be selected to not be significantly smaller in particle size than the proppant. The use of an overly fine particle (as part of a mixture with a standard proppant) may result in a loss in fracture conductivity.

Electrically conducting particles can be used for reflecting the electromagnetic radiation signals. Semi-conducting and non-conducting particles can be used to absorb the electromagnetic radiation signals or to propagate them during radar operations and/or imaging operations. The particles and/or proppants can be either electrically conducting, semi-conducting or non-conducting if desired. In an exemplary embodiment, the particles and/or proppants are electrically conducting and can reflect the electromagnetic radiation that it incident upon them. The electrically conducting particles facilitate the transmission of incident and reflected electromagnetic radiation. In another exemplary embodiment, the particles have a high dielectric constant and can facilitate the wave-guiding of the radiation signal.

In one embodiment, the semi-conducting and/or non-conducting particles are transparent to the electromagnetic radiation signals, i.e., they permit the electromagnetic radiation signals to pass through without any substantial attenuation. In another embodiment, the semi-conducting and/or non-conducting particles are opaque to the electromagnetic radiation signals, i.e., they completely absorb the electromagnetic radiation signals.

In one embodiment, a combination of semi-conducting, conducting and non-conducting particles and/or proppants may be introduced into the fracture to facilitate the process of developing an image of the fracture. Combinations of different types of particles and/or proppants can be used to improve imaging capabilities of the process. For example, it may be desirable to screen certain sections of the fracture from the electromagnetic radiation signals to facilitate imaging of other sections. Different types of particles and/or proppants can be introduced into the fracture either sequentially or simultaneously.

Examples of electrically conducting particles are metallic particles, non-conducting particles with metallic coatings, carbonaceous particles, electrically conducting metal oxides, electrically conducting polymer particles, or the like, or a combination comprising at least one of the foregoing particles.

Examples of non-conducting particles that can be coated with metals (in order to render them electrically conducting) are polymers such as thermoplastic polymers, thermosetting polymers, ionomers, dendrimers, or the like, or a combination comprising at least one of the foregoing polymers. The polymers are generally electrically insulating but can be made electrically conducting by coating them with a layer of electrically conducting metals. In an exemplary embodiment, the conducting particles and the non-conducting particles with metallic coatings can be magnetic or magnetizable.

When non-conducting particles are coated with metals (e.g. by disposing a metallic coating upon a polymeric substrate), it is generally desirable for the coated particles to have a bulk density of about 0.5 to about 4.0 grams per cubic centimeter ($g/cm^3$). It is desirable for the polymeric substrate to withstand down-hole temperatures. For example, it is desirable for the polymeric substrate to withstand temperatures of up to 200° C. In an extreme case, proppants such as sintered bauxite or coated bauxite may be used at temperatures as high as about 300° C.

Examples of carbonaceous particles are carbon black, coke, graphitic particles, fullerenes, carbon nanotubes such as single wall carbon nanotubes, double wall carbon nanotubes, multiwall carbon nanotubes, or the like, or a combination comprising at least one of the foregoing carbonaceous particles. Various types of conductive carbon fibers may also be used to reflect the electromagnetic radiation.

In one embodiment, the proppants or particles may comprise ceramic substrates or polymeric substrates that are coated with an electrically conducting coating that comprises polymers, carbon nanotubes and/or carbon black. The electrically conducting coating generally has a bulk resistivity of less than or equal to about $10^5$ ohm-cm. In another embodiment, the electrically conducting coating generally has a bulk resistivity of less than or equal to about $10^3$ ohm-cm.

It is desirable for the conducting particles and/or proppants to have an electrical resistivity less than or equal to about $10^{12}$ ohm-cm. In one embodiment, the conducting particles and/or proppants have an electrical resistivity less than or equal to about $10^8$ ohm-cm. In another embodiment, the conducting particles and/or proppants have an electrical resistivity less than or equal to about $10^5$ ohm-cm. In yet another embodiment, the conducting particles and/or proppants have an electrical resistivity less than or equal to about $10^3$ ohm-cm.

The semi-conducting particles can comprise silicon, gallium-arsenide, cadmium selenide, cadmium sulfide, zinc sulfide, lead sulfide, indium arsenide, indium antimonide, or the like, or a combination comprising at least one of the foregoing semiconducting particles.

Non-conducting particles and/or proppants include insulating polymers such as those listed above. The non-conducting particles and/or proppants and the semi-conducting particles and/or proppants referred to herein are all at least electrically non-conducting or semi-conducting. Non-conducting particles are also termed dielectric particles. Non-conducting particles or also include inorganic oxides, inorganic carbides, inorganic nitrides, inorganic hydroxides, inorganic oxides having hydroxide coatings, inorganic carbonitrides, inorganic oxynitrides, inorganic borides, inorganic borocarbides, or the like, or a combination comprising at least one of the foregoing inorganic materials.

Non-conducting particles and proppants also include electrically conducting metallic substrates or non-metallic inorganic substrates that are coated with electrically non-conducting polymeric coatings or electrically non-conducting ceramic coatings One exemplary class of non-conducting particles and/or proppants includes high dielectric constant particles and/or proppants. One class of non-conducting particles and/or proppants comprises non-conducting polymeric substrates that have filler dispersed in the particle. The non-conducting filler can comprise non-metallic inorganic particles, naturally occurring organic particles such as ground or crushed nut shells, ground or crushed seed shells, ground or crushed fruit pits, processed wood, ground or crushed animal bones; synthetically prepared organic particles, or the like, or a combination comprising at least one of the naturally occurring particles.

Another class of non-conducting particles is granules comprising a porous glass or ceramics that can absorb electromagnetic radiation incident upon them. Suitable granules can comprise a ferrite such as nickel-zinc or barium-ferrite, wherein the mass of carbon to ferrite is greater than 0.225. Examples of such materials are described in patent/patent application WO 02/13311. These granules have an average particle diameter of 0.2 to 4.0 millimeters. The total porosity is about 70 to about 80 volume percent. The bulk density if about 0.5 to about 0.8 grams per cubic centimeter.

The particles can have any desirable geometry and any desirable particle size distribution. The particle geometry can be platelet like, spherical, spheroidal, cuboid, conical, cylindrical, tubular, polygonal, or the like, or a combination comprising at least one of the foregoing geometries. The particles can have aspect ratios of greater than or equal to about 1. The aspect ratio as defined herein is the ratio of the largest dimension to the smallest dimension of the particle. In one embodiment, it is desirable to have an aspect ratio of greater than or equal to about 5. In another embodiment, it is desirable to have an aspect ratio of greater than or equal to about 50. In yet another, embodiment it is desirable to have an aspect ratio of greater than or equal to about 100.

The particles and/or proppants can be modified after being introduced into the fracture. For example, electrically non-conducting particles and/or proppants can be reacted after introduction into the fracture to form electrically conducting or semi-conducting particles and/or proppants. In one embodiment, the electrically non-conducting particles can be disposed upon a support prior to introduction into the fracture. The support can be a proppant, a porous inorganic substrate, an organic substrate, a fiber, or the like. In one embodiment, the electrically non-conducting particles can be coated onto the support and can exist in the form of a continuous coating upon the support. In another embodiment, the electrically non-conducting particles can form discrete particles on the support. After introduction into the fracture, the reaction converts the electrically non-conducting particles into electrically conducting or semi-conducting particles.

Examples of electrically non-conducting particles are metal salts such as metal sulfates, metal nitrates, metal chlorides, metal chlorates, metal fluorides, metal hydroxides, metal iodides, metal hydroxides, metal carbonates, metal acetates, metal bromides, or the like. The electrically non-conducting particles can be reacted with a gaseous or liquid reactant to form an electrically conducting particle. The reactants can be contained in the fracturing fluid or can be added to the fracture independent of the fracture fluid to facilitate the reaction. The fracture temperature, which is about 100 to about 250° C., can facilitate the reaction. Examples of suitable metal salts are aluminum nitrate, copper sulfate, copper nitrate, or the like, or a combination comprising at least one of the foregoing.

It is desirable for the smallest dimension of the particle to be on the order of 0.1 nanometers or greater. In another embodiment, the smallest dimension of the particle can be on the order of 10 nanometers or greater. In yet another embodiment, the smallest dimension of the particle can be on the order of 100 nanometers or greater. In yet another embodiment, the smallest dimension of the particle can be on the order of 1000 nanometers or greater.

If desired, particles having specific predetermined reflecting or absorbing characteristics different from other proppant may be restricted to being the first proppant pumped. This should ensure their deposition near the tip/end of the propped fracture (point of greatest distance from the wellbore). Thus, a first portion of proppant can be injected through the wellbore into the subterranean formation and subsequently a second portion of proppant can be injected through the wellbore into the subterranean formation such that the first portion of proppant travels to ends of fractures of the subterranean formation distal to the wellbore, wherein the first portion of proppant contains particles which reflect or absorb the source radar signal and the second portion of proppant has an absence of such particles.

If desired, the logging device could be employed in a method comprising injecting a first portion of proppant through the wellbore into the subterranean formation and subsequently injecting a second portion of proppant into the subterranean formation such that the first portion of proppant travels to ends of fractures of the subterranean formation distal to the wellbore, wherein the first portion of proppant contains particles which are nonlinear and create new frequencies, frequency distortions, or frequency disruptions from the source radar signal and the second portion of proppant has an absence of such nonlinear particles of the first portion. Use of nonlinear particles can help differentiate a reflection off a wall or turn from a signal/reflection which results from a signal from the transmitter reaching the end of the propped fracture.

Typical nonlinear materials function as a rectifier or a piezoelectric material or create intermodulation. Examples of non-linear components include lithium niobate, nickel oxide, iron oxide (ferric oxide or ferrous oxide), or copper oxide (cuprous oxide or cupric oxide).

For example, in detecting the end of a fracture using intermodulation noise the end of a fracture may be tagged using materials with a non-linear relationship between impedance and the voltage (or current) to which the tagging material is exposed. Such a non-linear relationship creates new frequencies that arise from the sum and difference of the frequencies that the material is exposed to and is called "Intermodulation". In particular, materials that create intermodulation contain a non-linearity (e.g., a non-linear bond) having impedance that varies according to the magnitude of the voltage or current to which it is exposed. When signals at two different frequencies (f1 and f2) pass through a non-linearity they create signals at their sum and difference frequencies (f1−f2 and f1+f2). These are known as "intermodulation products". When three signals pass through a non-linearity they create signals at the sum and difference frequencies of each pair of frequencies, plus frequencies corresponding to a number of other sum and difference relationships between them to achieve typically 6 intermodulation products in total.

Thus, in an advantageous method of the present invention such a tagging material with a non-linear relationship between impedance and the voltage (or current) to which the tagging material is exposed is sent into a fracture with a first portion of proppant to be preferentially sent to fracture tips distal to the wellbore. Subsequent portions of proppant sent into the wellbore would not include the selected tagging material of the first portion. Then, by simultaneously applying two or more different frequencies downhole to these fractures, intermodulation products can be created to create a distinctive signal or signals which can help differentiate a reflection off a wall or turn from a signal/reflection which results from reaching the end of the propped fracture.

In an alternative embodiment the tagging material is in all the proppant sent into fractures.

Ferrous metals, ferrite materials, metal salts, intermetallic species of copper, aluminum, iron, carbon and silicon are examples of materials which exhibit such a non-linear relationship between impedance and applied voltage to create intermodulation products.

Classes and causes of Intermodulation:

1) Presence of ferrous metals in the region of high RF fields: The hysteresis associated with permeable materials and a non-linear V-I curve produce intermodulation. Typical materials are steels, nickel alloys, and nickel iron alloys, for example INVAR (also called FeNi36, is an alloy of iron (64 wt. %) and nickel (wt. 36%) with some carbon and chromium) or variations such as FeNi42. "Super-Invar" (31 wt. % Ni-5 wt. % Co-Balance Iron, possibly with some carbon and chromium) or nickel-cobalt ferrous alloys, such as KOVAR (29 wt. % nickel, 17 wt, % cobalt, 0.2 wt, % silicon, 0.3 wt. % manganese, and 53.5 wt. % iron).

2) Metals in contact: This can form an inefficient rectifier: Cuprous oxide is a p-type semi-conductor. "Tunneling" through a thin oxide layer between similar metals is another mechanism.

3) Microarcing: Non-touching surfaces in close proximity can microarc above a certain potential, especially at high temperature and altitude.

4) Electrostriction of dielectrics and magnetostriction of ferrite material: The physical stress in the material alters the material's physical dimensions.

5) Excitation of spin-wave modes in Below Resonance Ferrite Devices: By controlling the microscopic properties, the bulk properties are modified.

6) Proximity to Ferromagnetic Resonance in Above Resonance Ferrite Devices: The mechanism which causes intermodulation generation also causes the non-reciprocity in the ferrite medium.

EXAMPLE 1

10 GHz prototype design and testing

Equipment

An embodiment of the invention was tested with the components that would be down-hole tested in an oven at temperatures from 20 to 210° C.

The test apparatus had the components shown in FIG. 3A and was used to measure the distance of the moving blades of a fan (not shown). Thus, the embodiment employed in this example included a microwave signal source (microwave frequency generator) 221, a laser driver (laser transmitter) 225, a modulator 226, an audio amplifier/filter 230, mixer 250, microwave frequency generator 240 and RF spectrum analyzer 260, as well as a photodiode 505 and transceiver 510. The modulator 226 was connected to the photodiode 505 by 1 kilometer of polyimide coated fiber 300. The transceiver 510 was connected to the audio amp/filter 230 by a twisted pair of wires 302 (shown in FIG. 3A). Also, in the example a DC bias was applied to the photodiode 505 through a twisted pair (not shown). A DC bias source and some type of wiring, for example a twisted pair (not shown), is typically used to supply the photodiode with DC voltage.

The laser transmitter 225 employed in the example encompassed all of the components required to generate a laser signal in fiber, and modulate the signal with an RF carrier. Since in use at an oil well the laser transmitter would reside above ground and would not be subject to any unusual temperatures, in these tests the laser transmitter was not in the oven. The laser transmitter included a custom driver and temperature controller board, an external intensity modulator, and a power RF amplifier/driver. An operation wavelength of 1550 nm was chosen for these tests for the following reasons:

The availability of high temperature polyimide coated single mode 1550 nm fiber.

The availability of high-RF bandwidth 1550 nm intensity modulators.

The availability of lasers with sufficient power at 1550 nm.

The availability of photodiodes with sufficient bandwidth and good responsivity at 1550 nm.

The capability to provide further optical amplification of 1550 nm signals with Erbium doped fiber amplifiers.

The RF power delivered over an intensity-modulated link can be derived from fundamental principles. The RF signal power, $S_{rf}$ delivered to the photodiode at peak AC photocurrent) is given by, $$S_{rf} = I^2 R_L \beta/2 = P_0^2 \eta R_L \beta/2$$

where I is the peak AC photocurrent, $R_L$ is the load impedance, $P_o$ is the average optical power, $\eta$, is the quantum efficiency of the photodiode, and $\beta$ is the optical modulation index. Taking $\beta=1$ and $\eta=0.8$, results in calculating that an average optical power of 7 mW (8.4 dBm) is required at the photodiode in order to obtain a 0 dBm RF power output into $R_L=50\Omega$.

The typical insertion loss into a Mach Zehnder intensity modulator is just over 3 dB (optical). The loss expected in the fiber is 0.6 dB/km. Hence, in the setup for these examples, with 1 km of fiber, the loss will be 0.6 dB. Hence the laser itself must deliver at least 8.4 dBm+3.6 dB=12 dBm (16 mW) of optical power.

In particular the apparatus of these examples included a JDS Uniphase CQF 935.708 telecommunications laser. This laser is rated for up to 40 mW of optical power. This telecommunications laser includes a built in thermoelectric cooler and thermistor.

A regulated current source supply and a temperature control system were also provided to be used with the laser. The thermal control circuit used Analog Devices ADN8830, a microchip designed specifically for laser temperature control. This is a pulsed current driver for the thermoelectric cooler with PID feedback compensation. The regulated current source uses a pair of Analog Devices ADN2830 chips. This device is designed specifically for driving laser diodes.

Figure 7:
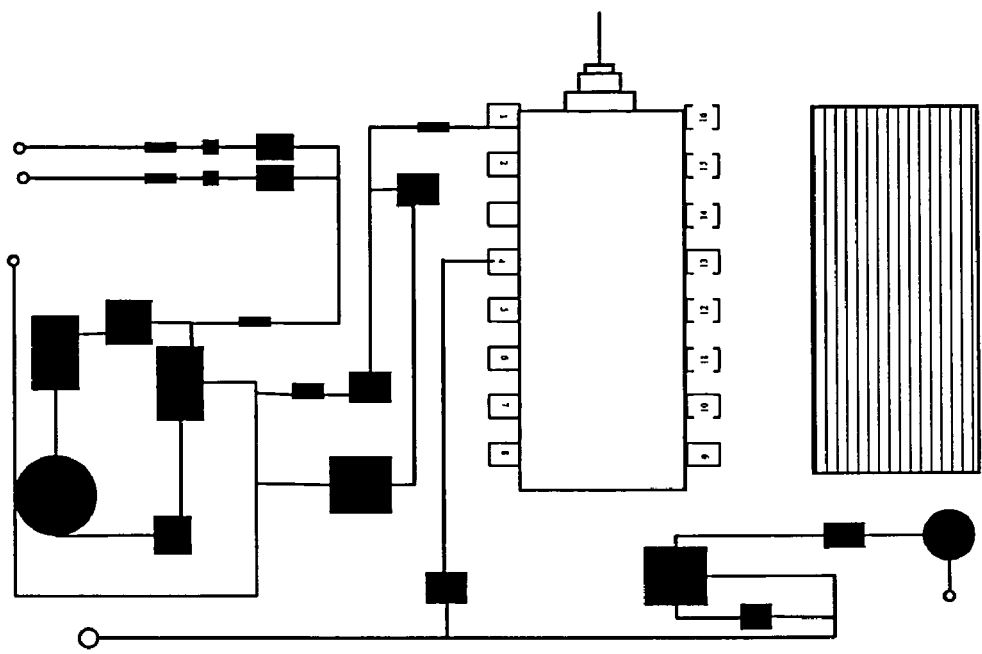
FIG. 7 is a drawing of a laser driver board that includes the laser diode, driver, and modulator.
Figure 8:
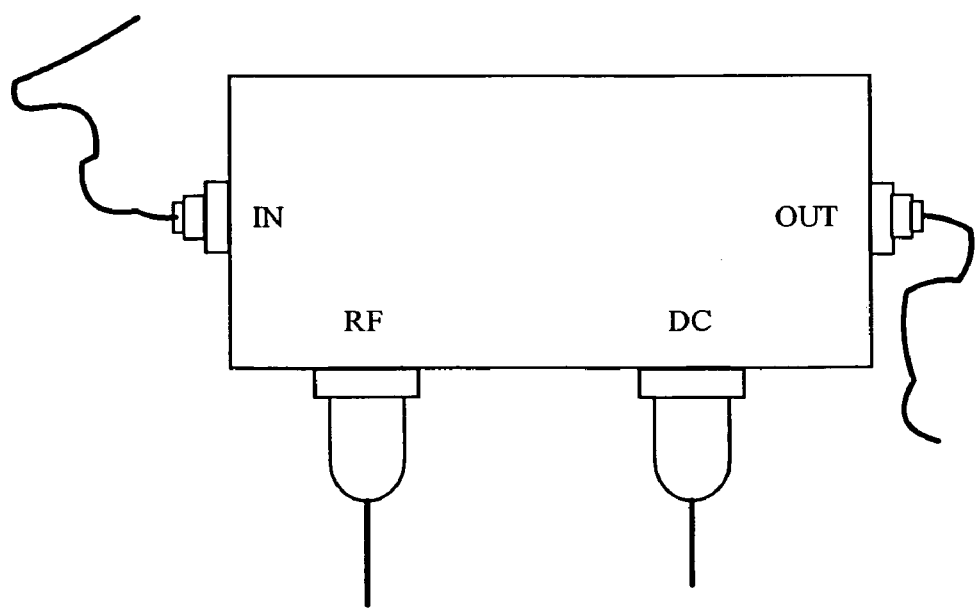
FIG. 8 is a drawing of an embodiment of the modulator of the embodiment of FIG. 3.

The laser diode, driver, and, cooling controller were designed as a single board as shown in FIG. 7. The Mach Zehnder modulator employed in these examples was a JDS Uniphase Lithium Niobate electro-optic modulator that converts optical phase modulation into intensity modulation via a Mach Zehnder optical interferometer. An RF drive power of approximately 26 dBm is required in order to obtain a 100% modulation index. Hence, the Mach Zehnder modulator was preceded with a Nextec-RF NB00422 10 GHz power amplifier. A drawing of the modulator is shown in FIG. 8.

The hybrid transceiver 510 included the components shown in above-discussed FIG. 5, namely, the hybrid coupler 515, the antenna 512, and the single balanced diode mixer 520. The lab version had a packaged photodiode connected to the transceiver assembly via semi-rigid coaxial cable. A production device could have the photodiode mounted on the transceiver assembly.

The photodiode 505 converted optical power into approximately 0 dBm (1 mW) of RF power at 10 GHz. As shown in FIG. 5, a portion of the 10 GHz signal was split in the hybrid coupler 515 and radiated through the antenna 512. The other portion was sent to the mixer 520 and used as a local oscillator (LO). The signal that was radiated from the antenna 512 was then returned through the same antenna 512 after propagating to and from the target (in this example the fan blades). The signal received by the antenna 512 was routed through the coupler 515 back to the mixer 520, where it was mixed with the LO. If the source RF signal was chirped, the return signal was shifted slightly in frequency from the LO and an audio beat frequency was produced by the mixer.

The photodiode 505 of this example was a Discovery Semiconductor DSC 40S photodiode. This device is designed for 10 Gb/s telecommunications applications, and has sufficient bandwidth to receive our 10 GHz intensity modulated signal. The diode is not rated for high temperature operation but, as seen below, the data resulting from this example did not indicate any degradation at our test temperatures of up to 210° C.

The antenna 512 of this example was a wideband bowtie antenna design. The bowtie antenna was modeled as a transmission line terminated in a radiation resistance. The characteristic impedance is a function of the bowtie angle and the resistance seen at the terminal is a function of both the antenna length and the bowtie angle. The antenna was fabricated on Rogers 4350 laminate, due to the high frequency characteristics and high temperature thermal stability of this material.

The antenna 512 was a bowtie antenna with a full width antenna angle of 90 degrees with a characteristic impedance of 198 Ohms as measured by time domain reflectometry. The best-measured match to the antenna was at 9.9 GHz where a feed-point impedance of 53-2 j Ohms at the bowtie feed-point was measured. Antennas other than a bowtie can be used, but the bowtie antenna is preferred for approximately 10 GHz operation.

Figure 9:
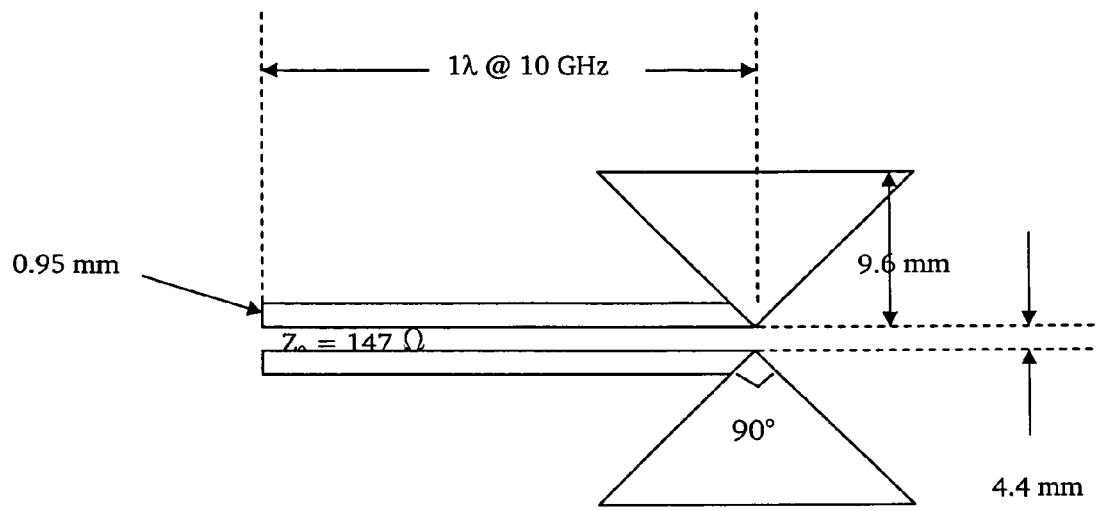
FIG. 9 is a schematic of a wideband bowtie antenna for an arrangement down-hole.
Figure 10:
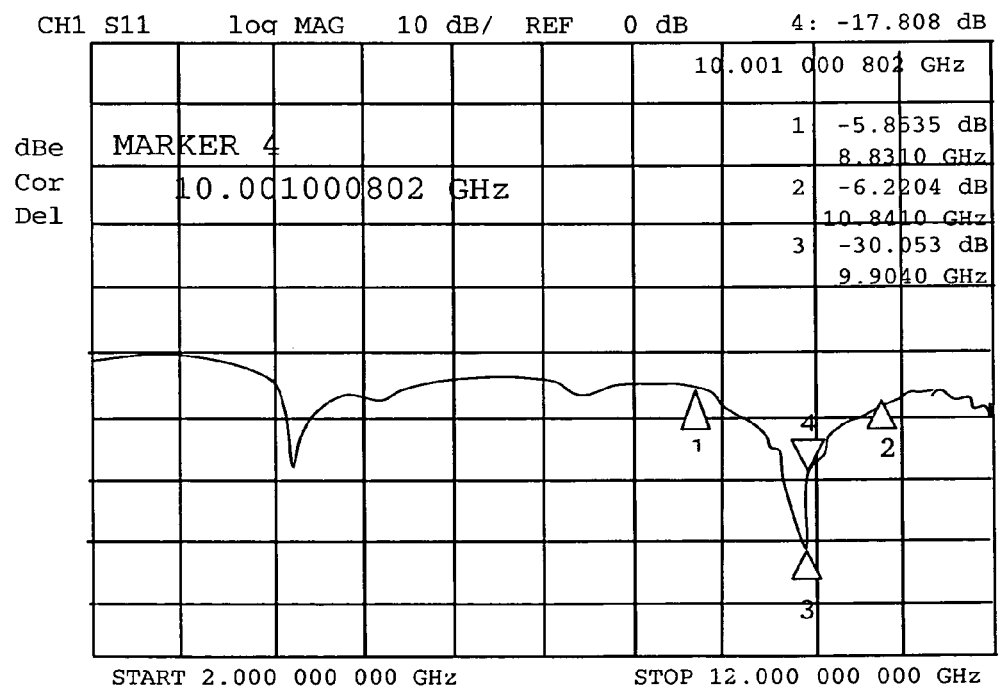
FIG. 10 is a graphical illustration of the antenna return loss in dB.

The antenna dimensions are shown in FIG. 9. FIG. 10 is a graphical illustration of the antenna return loss in dB. It should be noted that the loss measurements were approximately −17.8 dB (at Marker 4) for 10 GHz transmission, and −30.1 dB at 9.9 GHz transmission (at Marker 3).

The antenna 512 (FIG. 5) was fed through a one wavelength transmission line having a characteristic impedance of 147 Ohms. The feed-line was designed to be one wavelength long at 10 GHz to avoid transforming the antenna feed-point impedance. As will be discussed below, the inventors achieved better results with a signal on the order of 1 GHz rather than 10 GHz.

Figure 12:
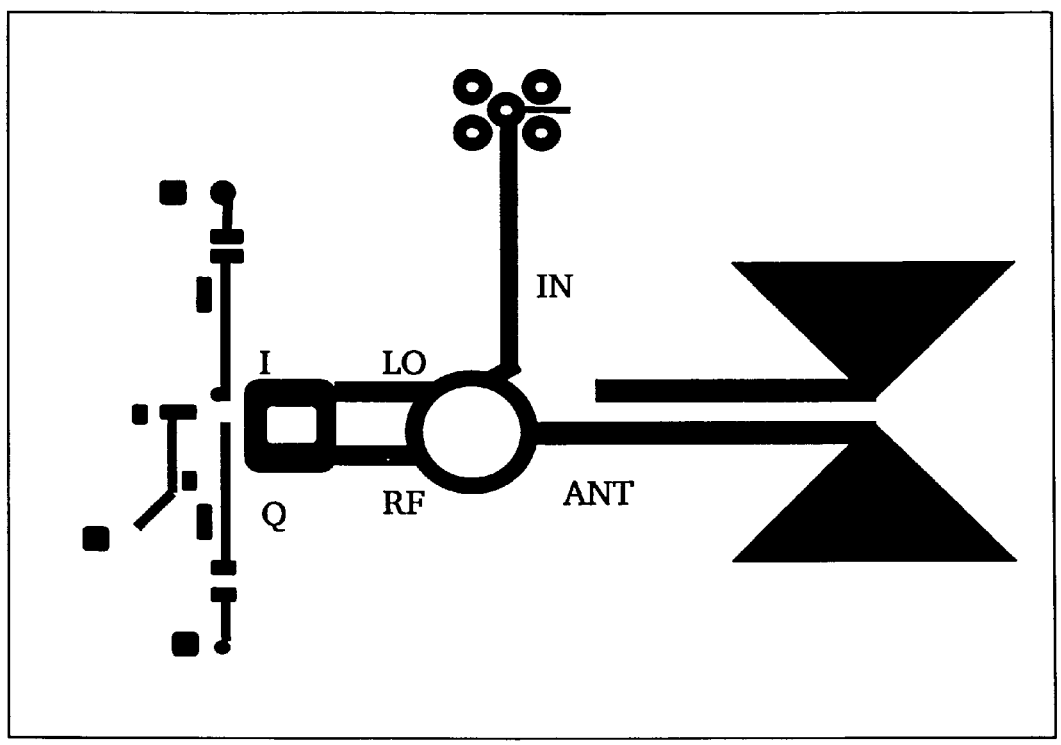
FIG. 12 is a drawing of the transceiver board including the hybrid coupler (unpopulated)

The hybrid coupler of this example was a standard 180 degree circular coupler, designed to operate at 10 GHz. A drawing of the coupler is shown in FIG. 12. RF power coupled into the input is split evenly between the antenna port and the mixer's LO port. Power received by the antenna is split between the mixer's RF port and the IN port. Power sent to the IN port is not used; this is a byproduct of the splitting function.

RF power sent to the LO and RF mixer ports is split between the "I" and "Q" ports on the (square) 90 degree splitter. The "I" and "Q" ports are each populated with zero bias RF mixing diodes, forming a single balanced mixer configuration. The output of the diodes is an audio frequency difference signal that is sent to the surface through twisted pair. Note that the input port contains a quarter wavelength stub; this provides a DC ground for the photodiode. FIG. 12 shows the transceiver board and hybrid coupler (unpopulated).

Procedure

Figure 13:
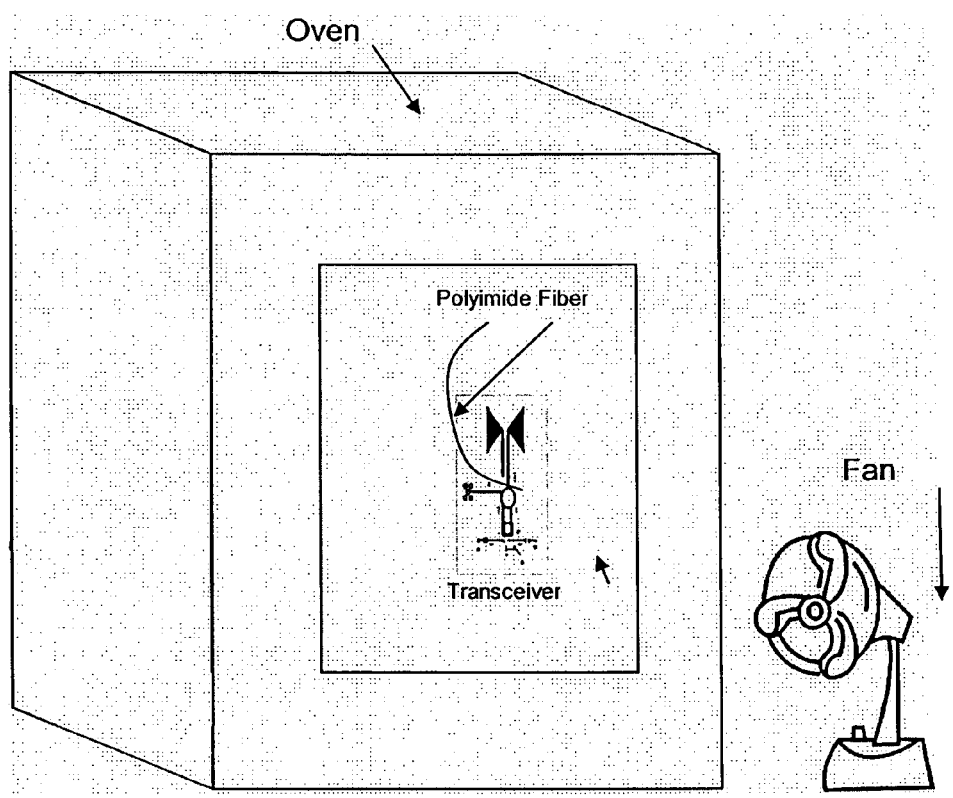
FIG. 13 is a drawing of the setup for an example of the present invention being tested for high temperature performance in an oven.

The following design, prototyping, and testing of each component, the radar system of this example was tested at down-hole temperatures of up to 210° C. The experimental setup is shown in FIG. 13.

The continuous 1550 nm laser signal from the transmitter board was intensity modulated with a 10 GHz CW microwave tone. The modulated laser signal was routed into an oven through 1 km of high temperature single mode polyimide coated fiber. The optical power loss of the fiber was measured as 0.6 dB/km. This corresponds to only 1.2 dBe/km of electrical/RF loss. The RF power delivered to the photodiode was up to −2 dBm with a DC photocurrent of 6 mA and an optical power of 7.4 mW.

The photodiode and custom transceiver were placed inside the oven. The oven contained a small (18 cm×28 cm) window, through which the 10 GHz signal could be radiated and received. The audio frequency signal output from the transceiver was fed back out of the oven through TEFLON coated twisted pair wires. For this experiment the photodiode bias was delivered through a separate pair of TEFLON coated twisted pair wires, although in the field, this DC bias voltage would be sent down-hole on the audio twisted pair.

Since this example was not performing tests in an anechoic chamber or the actual down-hole environment, the tests were performed with a moving test target to distinguish the target signature from background clutter such as workbenches, test equipment, and building structural components. Moreover, signal processing development was not included in this example and the moving target allowed the performance of the example without additional signal processing.

The target was a 30 cm diameter fan with metal blades. The target was placed just outside of the oven window. The metal cage was removed from the front of the fan such that the RF would reflect from the moving fan blades. A picture of the setup is shown in FIG. 13. The Doppler shift from the fan produced an ~810 Hz audio frequency return on the twisted pair output lines. The return was amplified and filtered to remove background 60 Hz power line hum. In lieu of audio frequency spectrum analysis, the audio return signal was mixed up to a center frequency of 10 MHz and viewed on an RF spectrum analyzer.

Results

Figure 14:
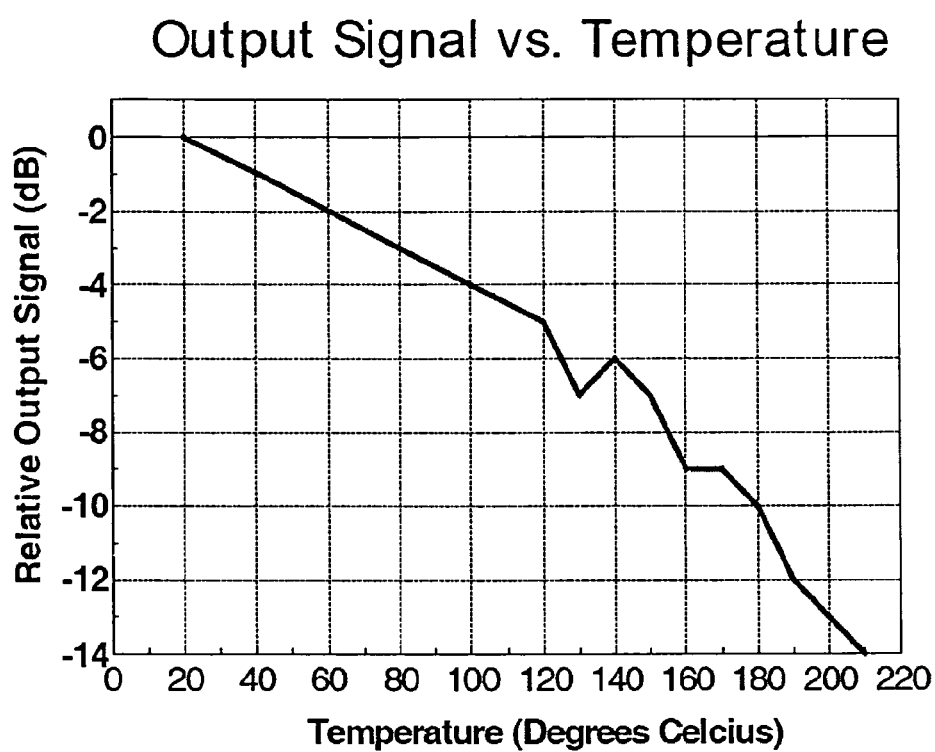
FIG. 14 is a graphical illustration of the output signal received versus the temperature in an experiment.
Figure 15:
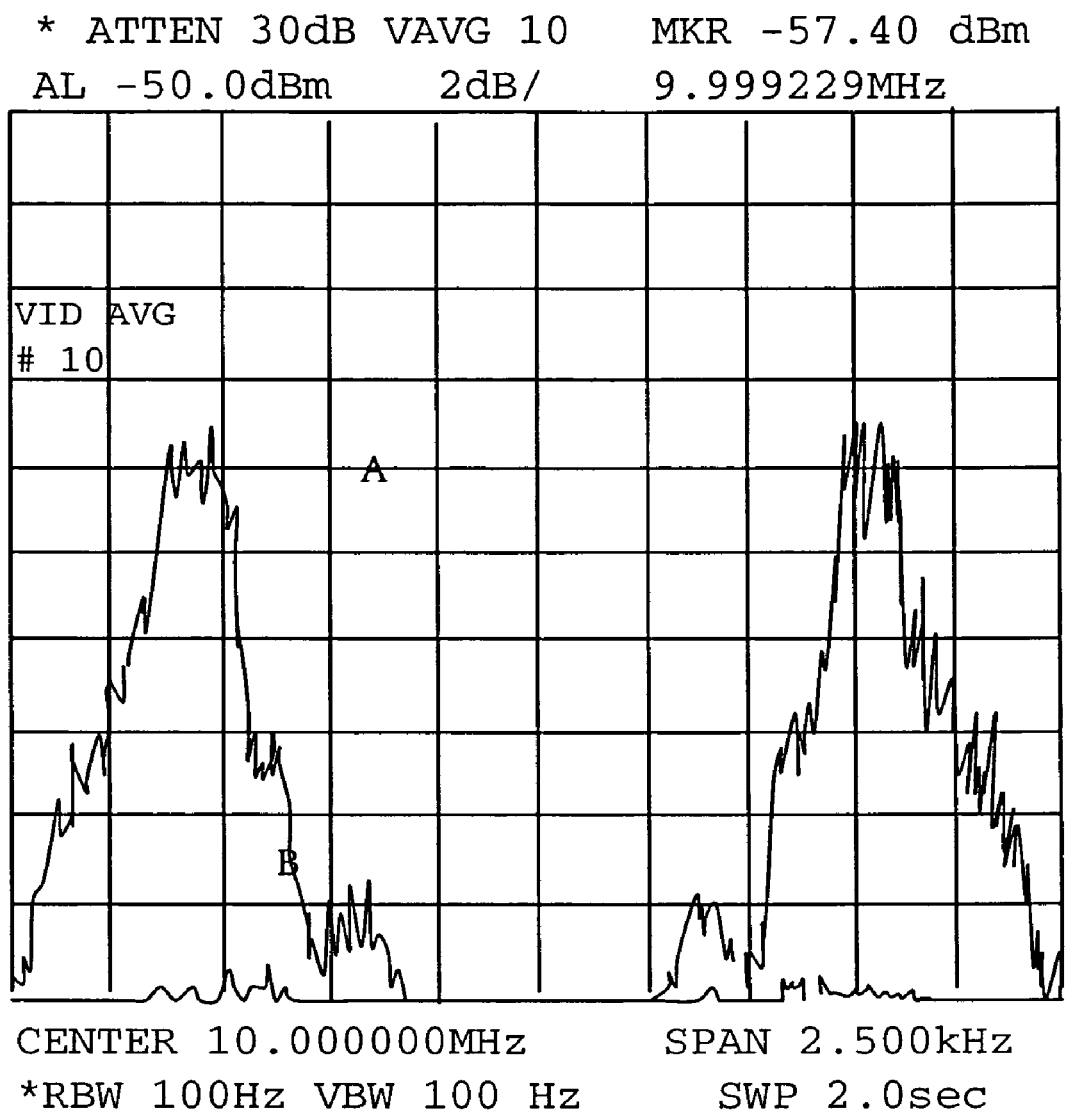
FIG. 15 is a graphical illustration of the Doppler shifted return signal frequency from a first experiment utilizing a moving target in lieu of a fracture in a wellbore.

The oven temperature was then increased from 20° C. to 210° C. A plot of the measured return signal power vs. oven temperature is shown in FIG. 14. A plot of the radar return showing the Doppler shifted audio frequency output is shown in FIG. 15. FIG. 15 shows the return signal frequency from a first experiment utilizing a moving target in lieu of a fracture in a wellbore. As discussed above, in this simulation a metal blade fan was set up to be the target. As shown in FIG. 15, a Doppler signal (A) of approximately—810 Hz is created by moving the fan. At point B on the graph, the fan is stopped and thus the Doppler signal (B) is about zero.

Analysis

The data in FIG. 14 indicated a reduction in received signal as the temperature is increased. Near room temperature the slope is −0.05 dB/C. Several factors together may contribute to the observed trend. Small temperature dependent changes in the circuit board substrate dielectric constant result in changes to the microwave matching in both the antenna and mixer. The carrier density and mobility within the photodiode and the mixing diodes are somewhat temperature dependent. The sensitivity of the photodiode is slightly temperature dependent. The moisture content of the air in the oven (and hence absorption at 10 GHz) is temperature dependent.

When the oven temperature exceeds 150° C., the slope became steeper. However, the solder connecting the photodiode to the receiver board was visibly melting and the SMA connector (between photodiode and transceiver) was coming out of the transceiver board under its own weight. This drop in signal was accompanied by a reduction in photocurrent. When cooled back down to room temperature, the measured signal remained degraded. After the solder connection was repaired, the signal level returned to within 1 dB of its previous level at room temperature. These results are all consistent with the melting solder that was observed.

To further verify that the melting solder near the photodiode was the only mode of failure, the photodiode was removed and a 10 GHz signal was injected directly into the transceiver port. Individual components including the antenna and diode mixer were individually heated with a 260° C. heat pencil and no performance degradation was observed.

The photodiode was then placed in the oven alone, and the RF power from the photodiode over temperature was measured. Less than 0.5 dB change in power was observed over the temperature test range of 22° C. to 180° C. These results all point to melting solder as the only mode of failure. Thus, this can be remedied by using a higher temperature solder.

It is expected that if the solder used here is replaced with a higher temperature solder, then the 0.05 dB/C trend will return and the output signal will be reduced by approximately 10 dB as the temperature is increased from 20° C. to 210° C. Increasing the laser drive power and/or employing good signal processing design in the receiver can counteract this reduction in power.

EXAMPLE 2

Propagation Experiments

The system of Example 1 was designed to operate at 10 GHz with a free space wavelength of 3 cm. This short wavelength was chosen to facilitate a 24 mm form factor on the down-hole receiver and antenna.

However, it was desired to learn about the electrical properties of various proppant that could be introduced into a subterranean fracture. The real and imaginary dielectric constant of such proppants influences the electromagnetic guiding properties of the fracture. This information, as well as the size of the casing, assists in choosing an optimum operating frequency.

Thus, after completing the 10 GHz prototype design and testing, the propagation loss in a few sample proppant materials was measured (understanding the optimal frequency may not be exactly 10 GHz).

Figure 16:
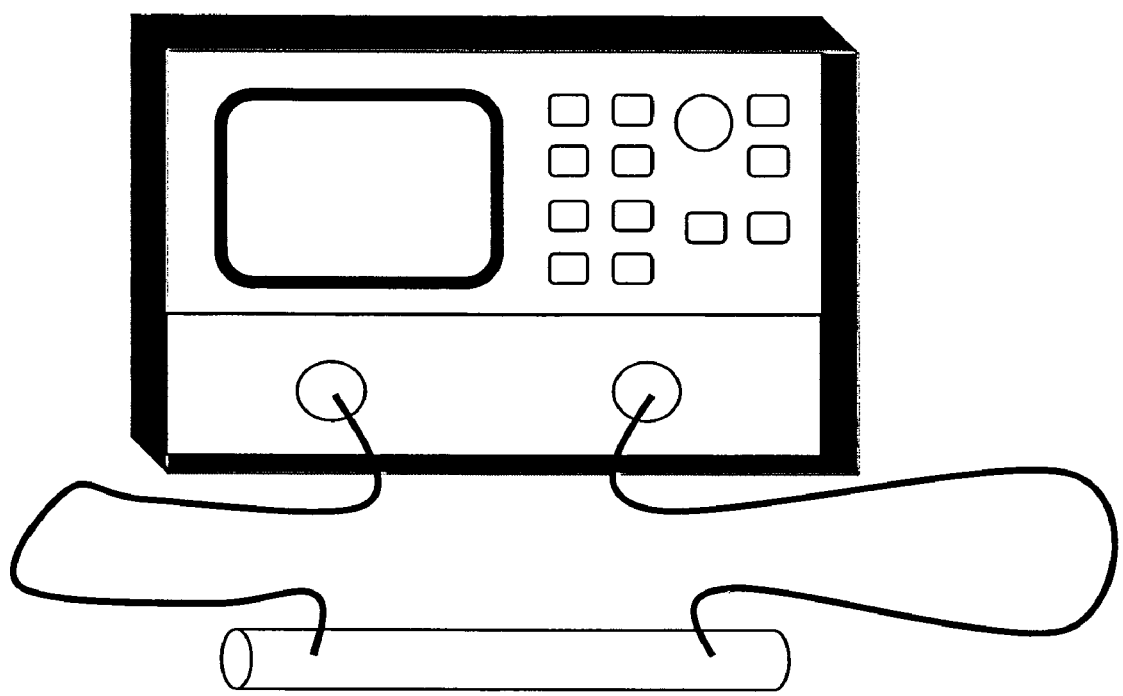
FIG. 16 is an illustration of a propagation test setup for a second experiment in which a short PVC tube with proppant is used as a sample.

The propagation experiment example was set up as follows. Two known lengths of 5 cm inside diameter Polyvinyl Chloride (PVC) pipe were capped at both ends after being filled with proppant. Slits were cut in each end of the pipe, allowing our broadband bowtie antenna to be inserted at each end. A drawing of the setup is shown in FIG. 16.

Results

Transmission loss, return loss, and delay between antennas were measured between 5 GHz and 15 GHz using a 20 GHz network analyzer. Table II summarizes the 10 GHz network analyzer measurements:

TABLE II

10 GHz Propagation Measurement Summary

| Proppant Material | Length (m) | 10 GHz Transmission S21 (dB) | 10 GHz Return Loss, S11 (dB) | Delay (ns) |
|---|---|---|---|---|
| Air | $l_1$ = 0.42 | −48 | | 2.3 |
| Sand | $l_1$ = 0.42 | −39 | | 3.1 |
| CERAMAX proppant | $l_1$ = 0.42 | −45 | | 3.3 |
| Air | $l_2$ = 2.47 | −53 | −13 | 10.5 |
| Sand | $l_2$ = 2.47 | −44 | −5 | 14.9 |
| CERAMAX proppant | $l_2$ = 2.47 | −76 | −7 | |

Analysis

Referring to Table II, comparing the results from the air filled PVC to the proppant filled PVC, indicates the presence of the proppants has a dramatic effect on the transmission loss (in dB).

Measurement of transmission loss through the air filled PVC tube shows a much lower loss than one would get from purely free space transmission, indicating that even the air filled PVC tube provides dielectric guiding. The measured 10 GHz propagation losses in PVC tubes filled with air, sand, and CERAMAX curable resin coated ceramic proppant, available from HEXION Specialty Chemicals, Houston, Tex. are estimated as follows:

$$L(\text{dB/m})=[S_{21}(l_1)-S_{21}(l_2)]/(l_2-l_1)$$

$$L_{air}(\text{dB/m})=[-48 \text{ dB}-(-53 \text{ dB})/(2.48 \text{ m}-0.42 \text{ m})]=2.44 \text{ } dB/m$$

$$L_{sand}(\text{dB/m})=[-39 \text{ dB}-(-44 \text{ dB})/(2.47 \text{ m}-0.42 \text{ m})]=2.44 \text{ } dB/m$$

$$L_{Ceramax}(\text{dB/m})=[-45 \text{ dB}-(-76 \text{ dB})/(2.48 \text{ m}-0.42 \text{ m})]=15.12 \text{ } dB/m$$

The CERAMAX proppant material, with 15 dB/m, has far too large an attenuation to be of practical use in a radar system. The air filled tube and sand filled tube both exhibited 2.44 dB/m attenuation. This ratio indicates that the PVC tube itself can be a significant source of loss when it is the only guiding dielectric material. However, note that sand filled tube produces a much longer propagation delay, indicating that the sand, not the PVC, is the dominant guiding material when the tube is sand filled.

TABLE III summarizes measurements of the propagation delay that were also made in order to estimate the effective dielectric constant of the proppant. The measured delay does include the delay required to radiate and receive the signal, therefore, the propagation velocity is best estimated from the longer, 247 cm measurement. The delay can be compared to the calculated free space delay to determine the relative velocity factor and index of refraction as shown in TABLE III. The air filled PVC tube alone has a velocity of 0.8×c. The addition of sand reduces the velocity to only 0.55×c. The loss in the CERAMAX proppant was too high to make an accurate measurement of the delay and velocity factor.

TABLE III

Measured Velocity Factors

| Parameter | Air Filled PVC tube | Sand Filled PVC tube |
|---|---|---|
| Velocity Factor | 0.8 | 0.55 |
| Ref Index ($n_{eff}$) | 1.3 | 1.8 |
| Dielectric Const ($\Sigma_r$) | 1.1 | 1.3 |

Measurements of the antenna return loss were also made to diagnose any detuning of the antenna due to dielectric loading. In the presence of both proppants, the antenna resonance is shifted below 10 GHz and the return loss becomes greater than our acceptable value of −15 dB.

Table IV summarizes results from measurements made at a frequency of 2 GHz. This experiment was done to evaluate the benefits of operating at lower frequencies. The 2 GHz measurements were made with the same antenna designed to operate at 10 GHz; therefore the antenna was electrically short and mismatched at 2 GHz. Furthermore the receiving antenna in the short 42 cm tube is not in the far field at 2 GHz. Hence, these results cannot be used to make a very accurate measurement of attenuation per unit length.

Nonetheless, it is noted that the overall transmission loss over 247 cm is significantly better than in the 10 GHz case in spite of the large antenna mismatch. Hence, the inventors conclude a reduction in frequency of operation to well below 10 GHz will significantly reduce overall transmission loss. This is consistent with theory that suggests approximately a 10 dB reduction in absorptive losses per order of magnitude reduction in frequency.

These results point toward the conclusion that the 10 GHz operational frequency results in unacceptably high transmission losses, and that the losses can be improved by reducing the frequency. The choice of operating frequency will be based upon a trade-off between antenna form factor efficiency, and frequency dependent transmission loss in the proppant.

The 10 GHz frequency is not preferred to measure a substantial propped fracture length (>20 ft) but has benefits if the use is to identify when a casing perforation is connected to a propped fracture.

TABLE IV shows the success with some of these items:

TABLE IV

2 GHz Propagation Measurement Summary

| Proppant Material | Length (cm) | 2 GHz Transmission S21 (dB) |
|---|---|---|
| Air | 42 | −44 |
| Sand | 42 | −36 |
| CERAMAX Proppant | 42 | −31 |
| Air | 247 | −49 |
| Sand | 247 | −34 |
| CERAMAX Proppant | 247 | −37 |

The new down-hole radar-logging device overcomes two important challenges. Namely, the radar can operate at high temperatures, and the microwave signals can be sent through several kilometers of fiber to reach the down-hole transceiver with minimal loss.

The invention solved the propagation problem by employing a high temperature low loss (about 1.2 dBe/km) fiber optic signal feed. The high temperature problem is solved by using a passive electronic design for the down-hole transceiver. The unique design uses passive electronic parts down-hole, including a photodiode and mixing diode. Both components performed well at high temperatures in this example.

Tests were preformed demonstrating the invention at temperatures as high as 210° C. This demonstration included all down-hole electronics and optics. For the first demonstration we used a moving test target. It was then determined that additional signal processing would be required to view a static target in the cluttered lab environment.

Temperature tests showed some degradation in signal level at high temperatures. Reduction of signal above 150° C. was found to be due to melting solder, a problem that will be easily remedied by use of a higher temperature solder in the next design. Additionally, a signal reduction of 0.05 dB/° C. was observed. This drop is acceptable since it can be countered by increasing the optical drive power.

There were some propagation measurements performed to determine the expected propagation loss in some sample proppants. It was determined that at 10 GHz, signal attenuation is too high to provide a practical range measurement over more than a few meters in the CERAMAX proppant. The sand proppant may be usable over a larger range at 10 GHz with additional signal processing.

Preliminary propagation measurements made at 2 GHz showed the propagation loss is lower (better) than at 10 GHz.

EXAMPLE 3

This example used a simulated fracture sandstone model to perform propagation tests with proppants to determine the optimal operational frequencies to be used in fracture length detection. The test frequency range used was from 250 MHz to 3 GHz. Sand and CERAMAX proppants were used in the sandstone test.

Figure 11A:
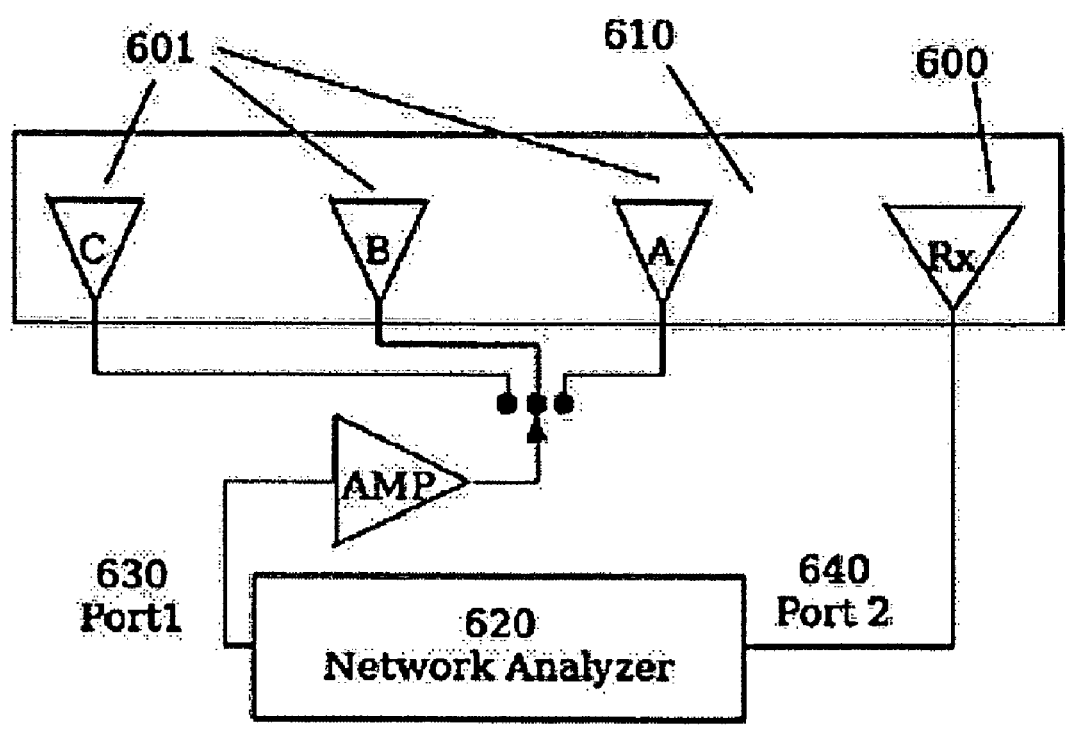
FIGS. 11A-11D illustrates sandstone test equipment used to evaluate propagation.

FIG. 11A shows the electronics setup for the propagation test. Antennas 600, 601 are placed in the slots within the braces and surrounded by foam encapsulated by the plywood structure. Two antennas 600, 601 were used in the tests. Transmitting antennas (601) were placed at different locations as shown in FIG. 11A. The microwave network analyzer 620 was used to generate signals ranging from 250 MHz to 3 GHz. As shown in FIG. 11A, the attenuation of the signal was measured by comparing the received signal level at the receiving antenna (element 600) as the transmitting antenna (element 601) was changed.

The network analyzer 620 generates a signal in the frequency range from 250 MHz to 3 GHz. This signal is amplified and sent to the transmitting antenna (element 601). The received signal is measured from the receiving antenna (element 600). Before the measurement, the system is calibrated to account for loss in the cables and any internal losses in the instrument.

Figure 11B:
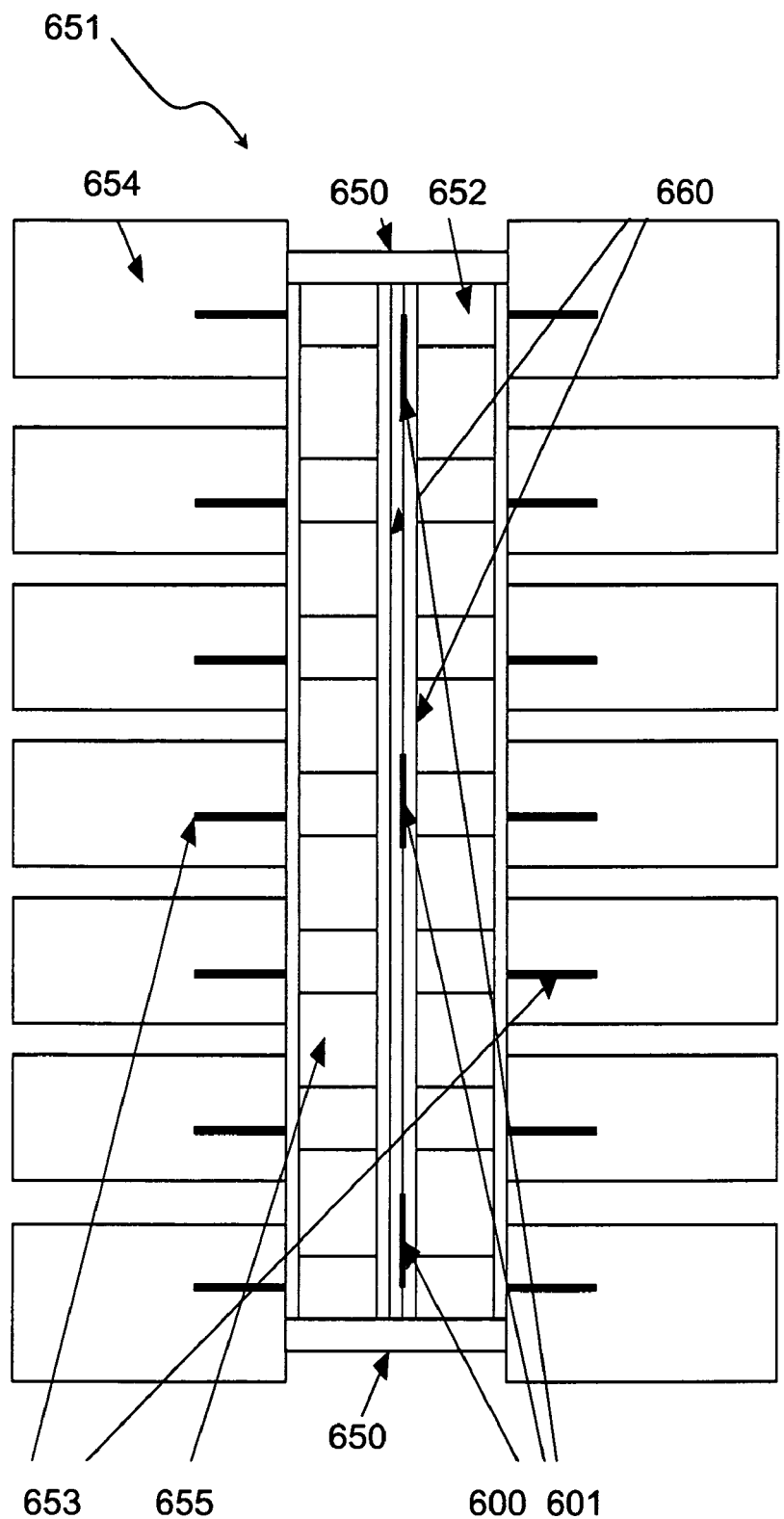

FIG. 11B shows a setup of the simulated fracture sandstone model 651, wherein the gap is adjustable and simulates the fracture and will be filled with coated sand and CERAMAX proppants. The model 651 was 2 feet high and 24 ft. long. It was 1 inch width at the simulated fracture and constructed from ¼ in. and ¾ in. exterior plywood (one side water resistant). It is mounted on seven 2 inch×12 inch×10 ft. planks for stability. Sides were supported by glued 2×4 boards 652 and 4×4 boards (not shown), attached to the 2 inch×12 inch by 10 feet boards 654 at 4 foot intervals. End cap 650 and spacer are made from 5 mm×½ in. firing strips, and glued in place. All joints are sealed with plumber's putty. In the tests, sandstone was used to "enclose" the proppants. Twelve sandstone slabs 660 (six on a side) were used to create the simulated fracture.

The sandstone slabs 660 are 2 feet×4 feet×2 inches thick, six on each side of the fracture enclosure. The model had cleats 653 and forms 655.

The antennas 600 and 601 are mounted parallel to the sandstone sides. The antennas are linearly polarized, and the azimuthal radiation pattern is approximately omnidirectional around the neck of the antenna.

The fracture model 651 simulates different environments. With different kinds of proppants, we have the following testing scenario matrix as listed in TABLE V:

TABLE V

| Medium | Medium Condition | Sandstone Condition |
| --- | --- | --- |
| Air | Dry | Moist |
| Proppant (sand) | Dry | Moist |
| Proppant (sand) | Wet | Moist |
| Proppant (Ceramax) | Dry | Moist |
| Proppant (Ceramax) | Wet | Moist |

The testing media "air" connotes a simulated fracture that is not filled with any propant. Tests were done with wet and dry proppants, because water may be present in the actual porosity of the fracture. The sandstone was saturated with water for three days prior to the test in order to simulate water content in the surrounding formation.

Theory

The propagation test is to measure signal loss from 250 MHz to 3 GHz in the proppant media under different conditions. In theory, the power received by the fixed receiving antenna can be related to the location of the transmitting antenna as follows:

$$P(z_2)[dBm] = P(z_1) = P(z_1)[dBm] - \alpha[dB/m] \times (z_2[m] - z_1[m]) \quad (1)$$

where $P(z_1)$ is the received power when the separation between transmitting and receiving antennas is $z_1$, $P(z_2)$ is the received power when the separation between transmitting and receiving antennas is $Z_2$, and where $P(z_1)$ is the received power when the separation between transmitting and receiving antennas is $z_1$, $P(z_2)$ is the received power when the separation between transmitting and receiving antennas is $Z_2$, and $\alpha$ is the attenuation in Decibels per meter.

The S parameter measured by the network analyzer measures the power loss (in dB) between the transmission and reception ports, such that equation (1) can be rewritten as follows:

$$S_{21}(z_2)[dB] = S_{21}(z_1)[dB] - \alpha[dB/m] \times (z_2[m] - z_1[m]) \quad (2)$$

Using equation (2) and measuring the $S_{21}$ at $z_1$ and $z_2$, the attenuation per unit length, $\alpha$ can be determined. Equation (2) is a good estimate only when the transmission mode is a guided wave and when $z_1$ and $Z_2$ are large enough to ensure that measurements are made in the far-field.

Using the above-described simulated fracture sandstone model, tests were performed for a specialized down hole radar. In the field, the radar signal will be propagated through a down hole fracture, which will be reinforced/filled with proppant. The model was developed to obtain electromagnetic propagation characteristics in this environment.

It was a goal of the test to determine the attenuation characteristics of the electromagnetic modes that would be supported in a fracture with proppant.

As described above, the simulated fracture sandstone model is outfitted with slots allowing the insertion of wideband antennas 600 and 601 into the simulated fracture at discrete locations. Network parameter ($S_{21}$) measurements were made at each of these locations to determine propagation characteristics.

The measurements were performed under both wet and dry conditions. The wet condition simulates porosity with irreducible water saturation.

Practical Considerations

Propagation through the fracture model will occur in two types of modes. First, a portion of the launched power will travel as a guided mode as described by equation (2).

However, a portion of the launched power may also travel as an unguided mode, expanding in a spherically shaped wave front as it traverses the fracture. However, propagation loss of this unguided mode is expected to decrease very quickly according to the following equation. Therefore at large distances, the guided mode described by equation (3) is more important.

$$L[dB] = 20 \times \log(r_2/r_1) \quad (3)$$

where L represents the signal path loss in dB between radius $r_2$ and radius $r_1$ when the transmission antenna is placed at the origin.

Test Procedure

A receiving antenna 600 was embedded at the origin of the model (as shown in FIG. 11A).

Figure 11C:
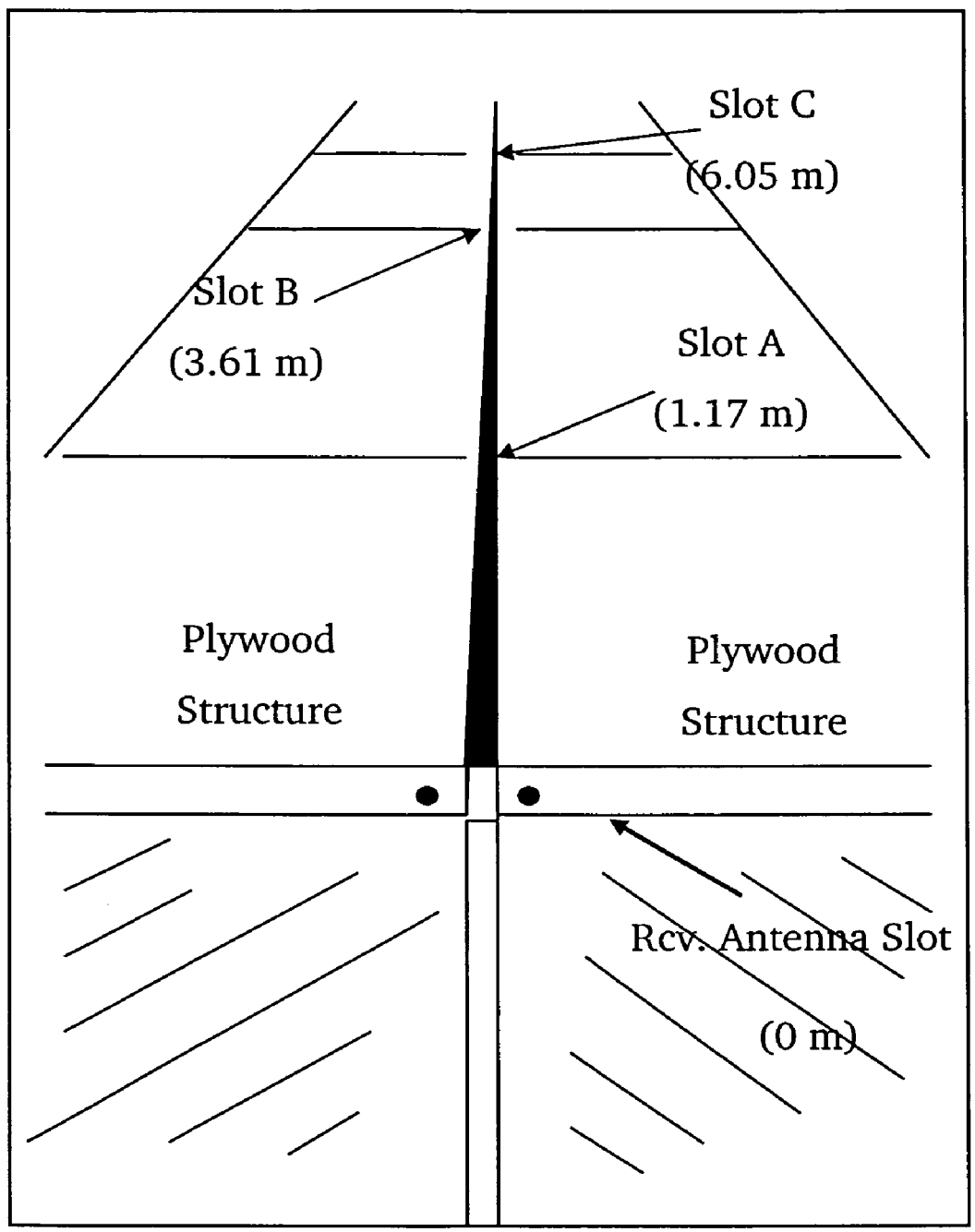

FIG. 11C shows a drawing of the model and showing a Slot for the receiving antenna as well as Slots A, B and C (and their distances from the receiving antenna slot at the origin.

The receiving antenna 600 was a wideband high pass antenna (1.1 GHz 3 dB roll-off). This antenna 600 was connected to Port 2 (element 640) of the network analyzer 620. Two additional transmission antennas 601 were then embedded in two of the three available antenna slots. The transmission antennas 601 were identical wideband high pass antennas (606 MHz 3-dB roll-off). The active transmission antenna 601 was connected to Port 1 (element 630) of the analyzer 620.

Two of the following three S parameters were then measured over frequency: $S_{21-A}$, $S_{21-B}$, $S_{21-C}$. Here $S_{21-A}$ implies excitation of the transmission antenna (601) at Slot A and reception by the receiving antenna (600) placed at the origin.

Before performing any measurements, the network analyzer 620 and antenna feed lines were calibrated by use of a 50 Ohm load, short circuit, and open circuit termination. The calibration removes the effects of frequency dependent loss in the transmission line and internal to the analyzer.

After embedding the antennas 600, 601 into the model, the $S_{21}$ parameters were measured with an empty fracture (air). The fracture was then filled with proppant and the measurements were repeated. The proppant was soaked with water and the measurements were again repeated. Finally, the foam surrounding the fracture was soaked with water and the measurements were repeated.

Measurements were performed at two sets of antenna slots. In the first experiment, $S_{21-A}$, and $S_{21-B}$ were measured. In the second set of experiments $S_{21-B}$, and $S_{21-C}$ were measured. By comparing the measured levels at either pair of locations, attenuation per unit length was estimated according to (2).

Choice of measurement location involved some trade-offs. In making the $S_{21-A}$ measurement, Slot A is only 0.12 meters from the source. This implies that at our lowest frequencies (<800 MHz), the antenna at Slot A and the receiving antenna will exhibit near field coupling. Therefore, the $S_{21-A}$ measurements are more meaningful at higher frequencies. Results for frequencies below 800 MHz were not recorded in the $S_{21-A}$ data TABLES VI and VII.

Similarly, in making the $S_{21-C}$ measurements, the signal loss between the origin and Slot C was high enough to attenuate the highest frequencies below the noise floor of the analyzer 620. Thus, the $S_{21-C}$ measurements at the lower frequencies provide more meaningful data. The measured signal level was at least 15 dB above the measured (post calibration) noise floor for the data to be recorded in the tables of results. For these reasons the data recorded in the tables for each of the experiments is at different set of frequencies.

Results

The measured data for $S_{21-A}$ and $S_{21-B}$ are presented in Table VI. A sample network analyzer screen drawing from this experiment is shown in FIG. 11D.

Figure 11D:
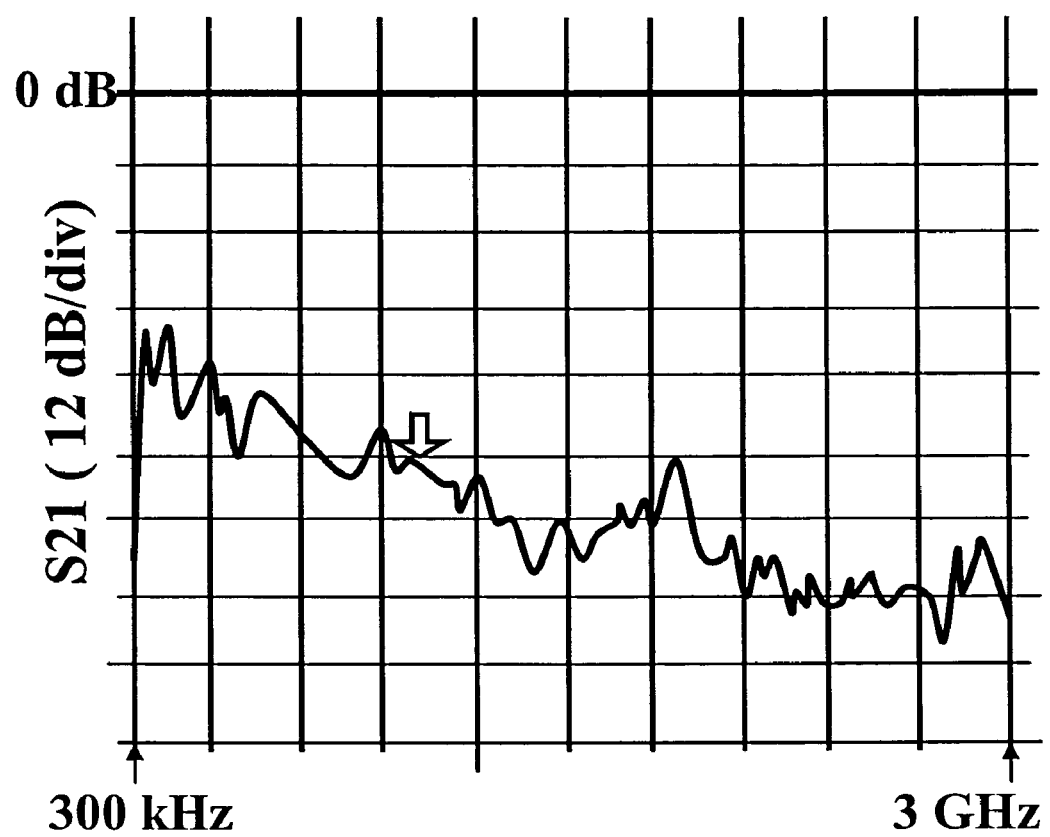

FIG. 11D is a drawing of a screen capture $S_{21-B}$ screen from the ACFRAC/ACPAK proppant and VERSAPROP proppant with "Wet Proppant/Wet Foam" in Table VI.

The measured data for or $S_{21-B}$ and $S_{21-C}$ are presented in Table VII. As discussed above, the most meaningful measurements from Table VI are those made at the highest frequencies, while the most meaningful measurements in Table VII are those made at lower frequencies. The reduction in attenuation with increased frequency in Table VI is consistent with near field effects occurring at the lower frequencies.

The highest frequency measurements from TABLE VI, shows an attenuation of ~5 dB/m in the 2-3 GHz range.

The lowest frequency measurements from TABLE VII for both (dry) air and PR600 proppant, shows a loss of 4-6 dB/m in the 250 MHz to 1 GHz range. The Ceramic proppant is somewhat more lossy with a 6-12 dB/m loss depending on the frequency and conditions (wet or dry). The air measurement with wet foam also presents us with a higher loss of 7-8 dB/meter.

TABLE VI

Propagation measured between the origin and Slot A ($S_{21-A}$) and Slot B ($S_{21-B}$).

| Proppant | Proppant/ Foam | Frequency (MHz) | S21-A (dB) | S21-B (dB) | Difference (dB) | Attenuation (dB/m) |
|---|---|---|---|---|---|---|
| Air | Dry/Dry | 1000 | −44 | −61 | 17 | 6.97 |
|  |  | 2000 | −62 | −77 | 15 | 6.15 |
|  |  | 3000 | −68 | −80 | 12 | 4.92 |
| ACFRAC/ACPAK and VERSA PROP | Dry/Dry | 1000 | −38 | −58 | 20 | 8.2 |
|  |  | 2000 | −58 | −72 | 14 | 5.74 |
|  |  | 3000 | −63 | −76 | 13 | 5.33 |
| ACFRAC/ACPAK and VERSA PROP | Wet/Dry | 1000 | −42 | −55 | 13 | 5.33 |
|  |  | 2000 | −65 | −79 | 14 | 5.74 |
|  |  | 3000 | −78 | −89 | 11 | 4.51 |

TABLE VI-continued

Propagation measured between the origin and Slot A ($S_{21-A}$) and Slot B ($S_{21-B}$).

| Proppant | Proppant/ Foam | Frequency (MHz) | S21-A (dB) | S21-B (dB) | Difference (dB) | Attenuation (dB/m) |
|---|---|---|---|---|---|---|
| ACFRAC/ACPAK and VERSA PROP | Wet/Wet | 1000 | −52 | −61 | 9 | 3.69 |
| | | 2000 | −65 | −78 | 13 | 5.33 |

TABLE VII

Propagation measured between the origin and Slot B ($S_{21-B}$) and Slot C ($S_{21-C}$).

| Proppant | Proppant/ Foam | Frequency (MHz) | S21-A (dB) | S21-B (dB) | Difference (dB) | Attenuation (dB/m) |
|---|---|---|---|---|---|---|
| Air | Dry/Dry | 250 | −39 | −53 | 14 | 5.74 |
| | | 1000 | −59 | −73 | 14 | 5.74 |
| | | 1500 | −69 | −78 | 9 | 3.69 |
| PR600 | Dry/Dry | 1000 | −58 | −67 | 9 | 3.69 |
| | | 1500 | −69 | −81 | 12 | 4.92 |
| PR600 | Wet/Dry | 250 | −40 | −53 | 13 | 5.33 |
| | | 1000 | −58 | −67 | 9 | 3.69 |
| | | 1500 | −72 | −81 | 9 | 3.69 |
| PR600 | Wet/Wet | 250 | −39 | −49 | 10 | 4.1 |
| | | 1000 | −56 | −69 | 13 | 5.33 |
| | | 1500 | −68 | −83 | 15 | 6.15 |
| Air | Dry/Wet | 250 | −40 | −58 | 18 | 7.38 |
| | | 600 | −48 | −67 | 19 | 7.79 |
| Ceramic | Dry/Wet | 250 | −38 | −59 | 21 | 8.61 |
| | | 600 | −40 | −70 | 30 | 12.3 |
| | | 1000 | −60 | −75 | 15 | 6.15 |
| Ceramic | Wet/Wet | 250 | −41 | −56 | 15 | 6.15 |
| | | 600 | −46 | −68 | 22 | 9.02 |

* "Dry" foam contained some residual moisture from previous day's measurements.

The present invention provides a significant advantage over attempted radar logging devices of the prior art. The high temperature problems associated with the non-operation of active components, and/or possible attempts to cool these components have been solved by using just passive components down-hole. The transceiver comprises a photodiode, a diode mixer, and a hybrid coupler (as well as the antenna). No amplification is required of the reflected signal as it will be mixed and travels back along a twisted pair as a beat frequency comprising an audio signal that is a fraction of the original microwave frequency.

It is also understood that an artisan will appreciate that another advantage of the present invention is that the spectrum analyzation can be performed above ground without having the down-hole constraints to overcome.

It is also clear that, although the invention has been described with reference to a specific example, a person of skill will certainly be able to achieve many other equivalent forms, all of which will come within the field and scope of the invention.

For example, while the generation of the modulated light signal occurs above the wellbore, it is possible that this signal could also be generated down-hole. To elaborate, the laser transmitter 225 and the modulator 226 (FIG. 3A) could be located down-hole and the microwave signal generated above the wellbore. Or it is possible the entire signal generation occurs down-hole. The placement of any or combinations of the laser transmitter, modulator or radar source could be below the ground but not at a depth where the ambient temperature impacts the operation of the equipment so as to render it unusable without cooling devices. In addition, the source radar signal can be encoded (for example, encoded other more sophisticated signals including but not limited to direct sequence coding) such that the return signal differs from the transmitted signal. The mixer then functions as a correlator that cross-correlates the encoded source radar signal with the return signal (e.g., reflected radar signal).

It should be apparent that embodiments other than those specifically described above come within the spirit and scope of the present invention. Thus, the present invention is not limited by the above description but rather is defined by the claims appended hereto.

We claim:

1. A method for radar logging down-hole in a wellbore of a subterranean formation without any down-hole cooling devices, the method comprising the steps of:
   providing at least one radar source having at least one predetermined frequency;
   providing at least one optical source having a predetermined wavelength;
   modulating at least one optical signal with at least one optical modulator in communication with at least one said radar source and at least one said optical source, at least one said optical signal being modulated according to at least one said radar source having the predetermined frequency;
   providing at least one said modulated optical signal to a transmitter and receiver unit, wherein the transmitter and receiver unit comprises:
   (a) at least one photodiode for converting at least one said modulated optical signal output from at least one said optical modulator to at least one radio frequency source radar signal;
   (b) at least one antenna in communication with at least one said photodiode; and
   (c) a mixer in communication with at least one said photodiode and at least one said antenna; and
   at least one said antenna receiving at least one said radio frequency source radar signal from at least one said photodiode, at least one said antenna transmitting at least one said radio frequency source radar signal into the formation, and at least one said antenna receiving a reflected radar signal; and
   the mixer mixing the reflected radar signal with at least one said radio frequency source radar signal to provide an output, then utilizing the output to identify fracture geometry.

2. The method according to claim 1, wherein at least one said photodiode, the mixer and at least one said antenna are coupled by a hybrid coupler, wherein a twisted pair cable receives the output from the transmitter and receiver unit.

3. The method according to claim 1, wherein said at least one radar source is arranged above ground.

4. The method according to claim 1, wherein at least one said radar source, at least one said optical source and at least one said optical modulator are arranged below ground.

5. The method according to claim 1, wherein at least one said radio frequency source radar signal is encoded, and the mixer comprises a correlator that cross-correlates the encoded source radar signal with the reflected radar signal.

6. The method according to claim 1, wherein the mixer comprises a diode mixer that outputs an audio frequency.

7. The method according to claim 1, further comprising injecting a first portion of proppant through the wellbore into the subterranean formation and subsequently injecting a second portion into the subterranean formation such that the first portion of proppant travels to ends of fractures of the subterranean formation distal to the wellbore, wherein the first portion of proppant contains particles which are nonlinear and create new frequencies from the source radar signal and the second portion of proppant has an absence of said particles.

8. The method according to claim 1, further comprising injecting a first portion of proppant through the wellbore into the subterranean formation and subsequently injecting a second portion into the subterranean formation such that the first portion of proppant travels to ends of fractures of the subterranean formation distal to the wellbore, wherein the first portion of proppant contains particles which reflect or absorb the source radar signal and the second portion of proppant has an absence of said particles.

9. A method for logging in a wellbore of a subterranean formation, without any down-hole cooling devices, comprising the steps of:
(I) locating perforations in a wellbore casing and determining perforations where fractures have originated by:
(a) lowering a logging device comprising a gyroscope and a transmitter and a receiver unit for transmitting at least one first signal in the range of about 7 to 12 GHz into a well at a predetermined depth, wherein a series of perforated intervals are arranged in the wellbore casing;
(b) anchoring the logging device in place;
(c) scanning the wellbore casing for perforations with the at least one first signal;
(d) transmitting data from a reflected signal of the at least one first signal used to scan for perforations;
(e) determining which perforations are connected to a fracture of at least predetermined minimal length based on the data transmitted in step (d); and
(f) cutting a 10-15 cm narrow slot to dissect a perforation identified as connecting to the fracture, and
(II) determining aspects of fracture geometry by:
(a) generating a microwave radar signal;
(b) coupling the microwave radar signal to an IM laser to form a modulated laser signal and transmitting the modulated laser signal down-hole,
(c) utilizing a down-hole transceiver comprising a photodiode to convert the modulated laser signal to a radio frequency signal;
(d) splitting the radio frequency signal by sending a first Rf portion to an antenna and a second Rf portion to a diode mixer;
(e) transmitting an output from the antenna, through the perforations and into the fracture, and receiving back a reflected wave;
(f) mixing the reflected wave with the second Rf portion and generating an audio frequency signal having a beat frequency;
(g) transmitting the audio frequency signal, without amplification, to a receiver; and
(h) determining the fracture geometry aspects from the beat frequency.

10. The method according to claim 9, wherein step (I) further comprises the steps of:
(g) propagating at least one second signal in the range of about 0.5 to 2 GHz through the slot cut in step (f) and out into the connecting fracture; and
(h) transmitting back to the surface for analysis data concerning the returning signal waves of the at least one second signal.

11. The method according to claim 10, wherein the at least one first signal is approximately 10 GHz and the at least one second signal is approximately 1 GHz.

12. The method according to claim 10, wherein step (I) further comprises:
repeating steps (g) and (h) for each slot cut into the casing to develop a configuration of the size of the fracture.

13. The method according to claim 9, wherein the cutting in step (I)(f) is performed with a saw or laser that is integral with the logging device.

14. A method for logging in a wellbore of a subterranean formation, without any down-hole cooling devices, comprising the steps of:
(I) determining portions of a wellbore casing in contact with fractures of the subterranean formation by:
(a) transmitting a signal of a predetermined frequency into the subterranean formation through at least a portion of the casing adjacent to a fracture in the subterranean formation, the portion of casing being substantially transparent to the predetermined frequency;
(b) receiving a reflected signal reflected back from the subterranean formation through the portion of casing; and
(c) locating a position of the fracture based on a reflected signal, and
(II) determining aspects of fracture geometry by:
(a) generating a microwave radar signal:
(b) coupling the microwave radar signal to an IM laser to form a modulated laser signal and transmitting the modulated laser signal down-hole;
(c) utilizing a down-hole transceiver comprising a photodiode to convert the modulated laser signal to a radio frequency signal;
(d) splitting the radio frequency signal by sending a first Rf portion to an antenna and a second Rf portion to a diode mixer;
(e) transmitting an output from the antenna, through the perforations and into the fracture, and receiving back a reflected wave;
(f) mixing the reflected wave with the second Rf portion and generating an audio frequency signal having a beat frequency;
(g) transmitting the audio frequency signal, without amplification, to a receiver; and
(h) determining the fracture geometry aspects from the beat frequency.

15. The method according to claim 14, wherein step (I) further comprises:
(d) arranging composite pup-joints in the casing, the composite pup-joints being substantially transparent to the signal of the predetermined frequency and the reflected signal.

16. The method according to claim 15, wherein at least some of the composite pup-joints are above and below the position of the fracture determined in step (I)(c):

and wherein step (I) further comprises:

(e) transmitting the signal of the predetermined frequency through the composite pup-joints above and below the position of the fracture determined in step (c) to determine whether a top and a bottom of the fracture have been located, so as to provide a determination of the height of the fracture.

17. The method according to claim 14, wherein the portion of the casing, adjacent to the fracture in the subterranean formation and substantially transparent to the predetermined frequency, comprises composite material.

18. The method according to claim 17, wherein the composite material comprises fiberglass and epoxy resin.

19. The method according to claim 14, wherein the predetermined frequency is in the range of about 0.5 to 12 GHz.

20. A method for logging a wellbore to determine aspects of fracture geometry, in the absence of down-hole cooling devices, comprising the steps of:

(a) generating a microwave radar signal;
(b) coupling the microwave radar signal to an IM laser to form a modulated laser signal and transmitting the modulated laser signal down-hole;
(c) utilizing a down-hole transceiver comprising a photodiode to convert the modulated laser signal to a radio frequency signal;
(d) splitting the radio frequency signal by sending a first Rf portion to an antenna and a second Rf portion to a diode mixer;
(e) transmitting an output from the antenna into a fracture and receiving back a reflected wave;
(f) mixing the reflected wave with the second Rf portion and generating an audio frequency signal having a beat frequency;
(g) transmitting the audio frequency signal, without amplification, to a receiver; and
(h) determining the fracture geometry aspects from the beat frequency.

* * * * *